United States Patent
Gao et al.

(10) Patent No.: US 11,843,435 B2
(45) Date of Patent: Dec. 12, 2023

(54) PRECODING MATRIX INDICATION METHOD AND RELATED DEVICE

(71) Applicant: HUAWEI TECHNOLOGIES CO., LTD., Shenzhen (CN)

(72) Inventors: Xiang Gao, Beijing (CN); Kunpeng Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 289 days.

(21) Appl. No.: 17/369,069

(22) Filed: Jul. 7, 2021

(65) Prior Publication Data

US 2021/0351828 A1  Nov. 11, 2021

Related U.S. Application Data

(63) Continuation of application No. PCT/CN2020/071016, filed on Jan. 8, 2020.

(30) Foreign Application Priority Data

Jan. 8, 2019 (CN) .......................... 201910016817.0

(51) Int. Cl.
*H04B 7/06* (2006.01)

(52) U.S. Cl.
CPC ......... *H04B 7/0639* (2013.01); *H04B 7/0634* (2013.01); *H04B 7/0658* (2013.01)

(58) Field of Classification Search
None
See application file for complete search history.

(56) References Cited

U.S. PATENT DOCUMENTS

2018/0302140 A1* 10/2018 Rahman ............... H04B 7/0626
2018/0323854 A1  11/2018 Yang et al.

FOREIGN PATENT DOCUMENTS

| CN | 102263619 A | 11/2011 |
| CN | 102868479 A | 1/2013 |
| CN | 103731244 A | 4/2014 |
| CN | 104202276 A | 12/2014 |
| CN | 107528622 A | 12/2017 |
| CN | 107888323 A | 4/2018 |

(Continued)

OTHER PUBLICATIONS

Huawei et al. "Category 1 codebook design for Type II codebook." 3GPP TSG RAN WG1 Meeting #89, R1-1708139. Hangzhou, China. May 15-19, 2017. 9 pages.

(Continued)

*Primary Examiner* — Minh Trang T Nguyen
(74) *Attorney, Agent, or Firm* — Maier & Maier, PLLC

(57) ABSTRACT

A precoding matrix indication method and a related device. In the method, a transmit end can group K combination coefficients based on an amplitude value of each of the K combination coefficients, to obtain Q combination coefficient groups, and determine a phase value of each combination coefficient in each combination coefficient group. The amplitude value of each combination coefficient is determined by using a same amplitude quantization bit quantity and a same amplitude quantization rule. In addition, phase quantization bit quantities and/or phase quantization rules used by at least two of the Q combination coefficient groups are different.

20 Claims, 5 Drawing Sheets

(56) References Cited

FOREIGN PATENT DOCUMENTS

| CN | 108271265 A | 7/2018 |
|---|---|---|
| CN | 108809372 A | 11/2018 |
| CN | 108988917 A | 12/2018 |
| CN | 109150412 A | 1/2019 |

OTHER PUBLICATIONS

NTT Docomo. "Type II CSI feedback overhead reduction." 3GPP TSG RAN WG1 Meeting #95, R1-1813332. Spokane, USA. Nov. 12-16, 2018. 4 pages.
Huawei et al. "The impact of basis vectors for codebook enhancement." 3GPP TSG RAN WG1 Meeting #95. Spokane, USA. Nov. 12-16, 2018. R1-1813692. 4 pages.
Huawei et al. "Design for Type I Feedback." 3GPP TSG RAN WG1 Meeting #88. Athens, Greece. Feb. 13-17, 2017. R1-1703343. 6 pages.
Huawei et al. "Enhancements on CSI reporting and codebook design." 3GPP TSG RAN WG1 Meeting #94 Gothenburg, Sweden. Aug. 20-24, 2018. R1-1808949. 7 pages.
Huawei et al., "Discussion on CSI enhancement", 3GPP Draft; R1-1812242, XP051554124; 8 pages.
Huawei et al., "Quantization bit for codebook enhancement", 3GPP Draft; R1-1813693, XP051555751; 4 pages.
Samsung., "Type II CSI reporting", 3GPP Draft; R1-1707962, XP051273160; 14 pages.

* cited by examiner

PRECODING MATRIX INDICATION METHOD AND RELATED DEVICE

CROSS-REFERENCE TO RELATED APPLICATIONS

This application is a continuation of International Application No. PCT/CN2020/071016, filed on Jan. 8, 2020, which claims priority to Chinese Patent Application No. 201910016817.0, filed on Jan. 8, 2019. The disclosures of the aforementioned applications are hereby incorporated by reference in their entireties.

TECHNICAL FIELD

The embodiments relate to the field of communications technologies, and in particular, to a precoding matrix indication method and a related device.

BACKGROUND

Currently, in a massive multiple input multiple output (Massive MIMO) system, spectral efficiency can be significantly improved by using a large-scale antenna, and accuracy of channel state information obtained by a base station determines performance of massive MIMO to a great extent. Therefore, a codebook is usually used to quantize the channel state information. When the codebook is used to quantize the channel state information, an original channel feature needs to be approximated as much as possible with allowable overheads, so that channel quantization is more accurate.

A significant performance advantage may be obtained by performing linear combination on a plurality of orthogonal beams by using a high-precision codebook. For example, based on an idea of space domain compression and frequency domain compression, when determining, based on measured channel information, a precoding matrix W that matches channel information, a transmit end may perform linear combination on L spatial domain beam base vectors and M frequency-domain base vectors, that is, $W=W_1 * \tilde{W} * W_3$. $W_1$ is a spatial domain beam base vector matrix including the L spatial domain beam base vectors; $W_3$ is a frequency-domain base vector matrix including the M frequency-domain base vectors; and $\tilde{W}$ is a combination coefficient matrix obtained after linear combination is performed on the L spatial domain beam base vectors and the M frequency-domain base vectors.

However, when the foregoing precoding matrix is reported, in addition to indexes of the L used spatial domain beam base vectors and indexes of the M used frequency-domain base vectors, a combination coefficient in the combination coefficient matrix further needs to be reported, leading to relatively high reporting overheads. Therefore, how to reduce reporting overheads while reducing a system performance loss caused by quantization is a problem urgently needing to be resolved.

SUMMARY

The embodiments provide a precoding matrix indication method and a related device, to help reduce reporting overheads while minimizing a performance loss.

According to a first aspect, the embodiments provide a precoding matrix indication method. In the method, a transmit end determines an amplitude value of each of K combination coefficients corresponding to each spatial layer, where the amplitude value of each combination coefficient is determined by using a same amplitude quantization bit quantity and a same amplitude quantization rule; further, the transmit end may further group the K combination coefficients based on the amplitude value of each combination coefficient, to obtain Q combination coefficient groups, where Q is an integer greater than or equal to 2; the transmit end determines a phase value of each combination coefficient in each combination coefficient group, where phase quantization bit quantities and/or phase quantization rules used by at least two of the Q combination coefficient groups are different; and further, the transmit end may send precoding matrix indication information, where the precoding matrix indication information includes the amplitude value and the phase value of each of the K combination coefficients.

The K combination coefficients are some or all of corresponding combination coefficients obtained through linear combination of L spatial domain beam base vectors and M frequency-domain base vectors that correspond to one spatial layer, and K is a positive integer less than or equal to L*M. Space-domain beam base vectors and frequency-domain base vectors that correspond to the spatial layers may be the same, or may be different. However, the K combination coefficients corresponding to each spatial layer may be reported by using the precoding matrix indication method in the embodiments. In the embodiments, how to report K combination coefficients corresponding to one spatial layer is used as an example for description.

It can be understood that, in the embodiments, the amplitude value of each combination coefficient is determined by using the same amplitude quantization bit quantity and the same amplitude quantization rule, so that the transmit end does not need to additionally indicate a grouping status of the K combination coefficients, and a receive end can determine the grouping status based on the amplitude value of each combination coefficient. In addition, the phase quantization bit quantities and/or the phase quantization rules used by the at least two of the Q combination coefficient groups are different, thereby facilitating use of different phase quantization precision based on different degrees of impact of different combination coefficient groups on performance, and further helping reduce reporting overheads while minimizing a performance loss.

In this embodiment, values of L, M, Q, and K may be determined through predefinition or through notification by using signaling. That is, the values of the foregoing parameters are known to both the transmit end and the receive end.

In an optional implementation, that the transmit end groups the K combination coefficients based on the amplitude value of each of the K combination coefficients, to obtain the Q combination coefficient groups may include: The transmit end groups the K combination coefficients based on a descending order or ascending order of the amplitude values of all of the K combination coefficients, to obtain the Q combination coefficient groups. For example, the K combination coefficients are arranged in descending or ascending order of the amplitude values, and the K arranged combination coefficients are grouped, to obtain the Q combination coefficient groups.

It can be understood that this implementation facilitates use of different phase quantization precision based on different degrees of impact of different combination coefficient groups on performance, and further helps reduce reporting overheads while minimizing a performance loss. For example, in at least two of the Q combination coefficient groups, a phase quantization bit quantity and a phase quantization rule that are used by a combination coefficient group with a larger minimum amplitude value, a larger amplitude value sum, or a larger maximum amplitude value correspond to a quantization method with higher quantization precision; and a phase quantization bit quantity and a phase quantization rule that are used by a combination coefficient group with a smaller minimum amplitude value, a smaller amplitude value sum, or a smaller maximum amplitude value correspond to a quantization method with lower quantization precision, thereby reducing reporting overheads while minimizing a performance loss.

Quantities of combination coefficients included in the combination coefficient groups may be the same, or may be different.

In an example, each of the first combination coefficient group to a $(Q-1)^{th}$ combination coefficient group may include $\lfloor K/Q \rfloor$ combination coefficients, and a $Q^{th}$ combination coefficient group includes $K-\lfloor K/Q \rfloor(Q-1)$ combination coefficients. In descending order of the amplitude values of the K combination coefficients, the first combination coefficient group includes $\lfloor K/Q \rfloor$ combination coefficients with largest amplitude values in the K combination coefficients; the $Q^{th}$ combination coefficient group includes $K-\lfloor K/Q \rfloor (Q-1)$ combination coefficients with smallest amplitude values in the K combination coefficients; and if Q is an integer greater than or equal to 3, a $q^{th}$ combination coefficient group includes $\lfloor K/Q \rfloor$ combination coefficients with largest amplitude values other than $\lfloor K/Q \rfloor *(q-1)$ combination coefficients with largest amplitude values in the K combination coefficients, and q is an integer greater than 1 and less than Q.

In another example, the quantity of combination coefficients included in each combination coefficient group may be predefined or notified by using signaling. That is, a $q^{th}$ combination coefficient group in the Q combination coefficient groups includes $k_q$ combination coefficients, where q is an integer greater than or equal to 1 and less than or equal to Q, and $k_q$ is predefined or notified by using signaling. Quantities $k_q$ of combination coefficients included in the combination coefficient groups may be the same, or may be different, and $$\sum_{q=1}^{Q} k_q = K.$$

In this way, the first combination coefficient group includes $k_1$ combination coefficients with largest amplitude values in the K combination coefficients; a $Q^{th}$ combination coefficient group includes $k_Q$ combination coefficients with smallest amplitude values in the K combination coefficients; and if Q is an integer greater than or equal to 3, the $q^{th}$ combination coefficient group includes $k_q$ combination coefficients with largest amplitude values other than $$\sum_{q=1}^{q-1} k_q$$

combination coefficients with largest amplitude values in the K combination coefficients.

In this implementation, a plurality of combination coefficients with same amplitude values may be grouped based on indexes of spatial domain beam base vectors corresponding to the plurality of combination coefficients or indexes of frequency-domain base vectors corresponding to the plurality of combination coefficients. For example, in a grouping process, if amplitude values of a plurality of combination coefficients are the same, based on the quantity of combination coefficients included in each combination coefficient group, when a part of the plurality of combination coefficients needs to be grouped into a combination coefficient group with a larger amplitude value, and the other part needs to be grouped into a combination coefficient group with a smaller amplitude value, a part of combination coefficients with a larger or smaller index of a corresponding spatial domain beam base vector or frequency-domain beam base vector in the plurality of combination coefficients may be grouped into the combination coefficient group with the larger amplitude value, and the other part may be grouped into the combination coefficient group with the smaller amplitude value. If indexes of corresponding spatial domain beam base vectors or frequency-domain beam base vectors are the same, the part with the larger or smaller index of the corresponding frequency-domain beam base vector or spatial domain beam base vector may be further grouped into the combination coefficient group with the larger amplitude value, and the other part may be further grouped into the combination coefficient group with the smaller amplitude value.

Optionally, in this implementation, in the Q combination coefficient groups, a minimum amplitude value, a maximum amplitude value, or sum of amplitude value(s) of combination coefficients in a $q_1^{th}$ combination coefficient group is greater than a minimum amplitude value, a maximum amplitude value, or sum of amplitude value(s) of combination coefficients in a $q_2^{th}$ combination coefficient group; a phase quantization bit quantity $B_{q1}$ used by the combination coefficients in the $q_1^{th}$ combination coefficient group is greater than a phase quantization bit quantity $B_{q2}$ used by the combination coefficients in the $q_2^{th}$ combination coefficient group; $q_1$ is not equal to $q_2$; and $q_1$ and $q_2$ are integers greater than or equal to 1 and less than or equal to Q. For example, a minimum amplitude value, a maximum amplitude value, or sum of amplitude value(s) of combination coefficients in the first combination coefficient group is greater than a minimum amplitude value, a maximum amplitude value, or sum of amplitude value(s) of combination coefficients in the second combination coefficient group; and a phase quantization bit quantity used by phase values of the combination coefficients in the first combination coefficient group is greater than a phase quantization bit quantity used by phase values of the combination coefficients in the second combination coefficient group. Because the first combination coefficient group includes the combination coefficients with larger amplitude values, and has greater impact on system performance, quantization precision of the first combination coefficient group is higher, and quantization precision of the second combination coefficient group is lower. In this way, in this implementation, system overheads can be reduced while a system performance loss is minimized.

In another optional implementation, that the transmit end groups the K combination coefficients based on the amplitude value of each of the K combination coefficients, to obtain the Q combination coefficient groups includes: the transmit end determines, in the K combination coefficients, one or more combination coefficients corresponding to each of l spatial domain beam base vectors, where l is a positive integer less than or equal to L; the transmit end groups the l spatial domain beam base vectors based on a descending order or ascending order of sum of amplitude value(s), a maximum amplitude value, or a sum of power of the one or more combination coefficients corresponding to each spatial domain beam base vector, to obtain Q spatial domain beam base vector groups; and for one or more spatial domain beam base vectors in each of the Q spatial domain beam base vector groups, the transmit end determines all combination coefficients corresponding to the one or more spatial domain beam base vectors as one combination coefficient group, to obtain the Q combination coefficient groups corresponding to the Q spatial domain beam base vector groups.

The l spatial domain beam base vectors are spatial domain beam base vectors corresponding to all of the K combination coefficients. Quantities of spatial domain beam base vectors included in all of the Q spatial domain beam base vector groups may be the same, or may be different.

It can be understood that, in this implementation, the Q combination coefficient groups are in a one-to-one correspondence with the Q spatial domain beam base vector groups, thereby facilitating use of different phase quantization precision for corresponding combination coefficient groups based on different degrees of impact of the spatial domain beam base vectors on system performance, for example, use of different phase quantization bit quantities and/or phase quantization rules, and helping reduce reporting overheads while minimizing a system performance loss. For example, in at least two of the Q combination coefficient groups, in a spatial domain beam base vector group corresponding to a combination coefficient group, sum of amplitude value(s), a maximum amplitude value, and a sum of power of each spatial domain beam base vector are all larger, and a phase quantization bit quantity and a phase quantization rule that are used by the combination coefficient group correspond to a quantization method with higher quantization precision; and in a spatial domain beam base vector group corresponding to another combination coefficient group, sum of amplitude value(s), a maximum amplitude value, and a sum of power of each spatial domain beam base vector are all smaller, and a phase quantization bit quantity and a phase quantization rule that are used by the combination coefficient group correspond to a quantization method with lower quantization precision, thereby reducing reporting overheads while minimizing a performance loss.

In this implementation, a plurality of spatial domain beam base vectors with same amplitude value sums, same maximum amplitude values, or same sums of power may be grouped based on indexes of the plurality of spatial domain beam base vectors. For example, in a grouping process, if amplitude value sums, maximum amplitude values, or sums of power that correspond to a plurality of spatial domain beam base vectors are the same, based on the quantity of spatial domain beam base vectors included in each spatial domain beam base vector group, when a part of the plurality of spatial domain beam base vectors needs to be grouped into a spatial domain beam base vector group with a larger amplitude value sum, a larger maximum amplitude value, or a larger sum of power, and the other part needs to be grouped into a spatial domain beam base vector group with a smaller amplitude value sum, a smaller maximum amplitude value, or a smaller sum of power, a part of spatial domain beam base vectors with a larger or smaller index may be grouped into the spatial domain beam base vector group with the larger amplitude value sum, the larger maximum amplitude value, or the larger sum of power, and the other part may be grouped into the spatial domain beam base vector group with the smaller amplitude value sum, the smaller maximum amplitude value, or the smaller sum of power.

Optionally, in this implementation, in the Q combination coefficient groups, sum of amplitude value(s), a maximum amplitude value, and a sum of power of a combination coefficient corresponding to each spatial domain beam base vector in a $q_1^{th}$ spatial domain beam base vector group corresponding to a $q_1^{th}$ combination coefficient group are respectively greater than sum of amplitude value(s), a maximum amplitude value, and a sum of power of a combination coefficient corresponding to any spatial domain beam base vector in a $q_2^{th}$ spatial domain beam base vector group corresponding to a $q_2^{th}$ combination coefficient group; a phase quantization bit quantity $B_{q1}$ used by each combination coefficient in the $q_1^{th}$ combination coefficient group is greater than a phase quantization bit quantity $B_{q2}$ used by each combination coefficient in the $q_2^{th}$ combination coefficient group; $q_1$ is not equal to $q_2$; and $q_1$ and $q_2$ are integers greater than or equal to 1 and less than or equal to Q. It can be understood that, in this implementation, a larger amplitude value sum, a larger maximum amplitude value, or a larger sum of power that corresponds to each spatial domain beam base vector in a spatial domain beam base vector group indicates greater impact of the spatial domain beam base vector group on system performance. Therefore, use of a larger phase quantization bit quantity by the spatial domain beam base vector group can reduce a system performance loss. In addition, a smaller amplitude value sum, a smaller maximum amplitude value, or a smaller sum of power that corresponds to each spatial domain beam base vector in a spatial domain beam base vector group indicates less impact of the spatial domain beam base vector group on system performance Therefore, use of a smaller phase quantization bit quantity by the spatial domain beam base vector group can reduce reporting overheads. Therefore, in this implementation, a compromise between minimization of the system performance loss and reduction of the reporting overheads can be achieved.

In still another optional implementation, the transmit end may determine, in the K combination coefficients, one or more combination coefficients corresponding to each of m frequency-domain base vectors, where m is a positive integer less than or equal to M; the transmit end groups the m frequency-domain base vectors based on sum of amplitude value(s), a maximum amplitude value, or a sum of power of the one or more combination coefficients corresponding to each frequency-domain base vector, to obtain Q frequency-domain base vector groups; and for one or more frequency-domain base vectors in each of the Q frequency-domain base vector groups, the transmit end determines all combination coefficients corresponding to the one or more frequency-domain base vectors as one combination coefficient group, to obtain the Q combination coefficient groups corresponding to the Q frequency-domain base vector groups. The m frequency-domain base vectors are frequency-domain base vectors corresponding to all of the K combination coefficients. Quantities of frequency-domain base vectors included in all of the Q frequency-domain base vector groups may be the same or different.

It can be understood that, in this implementation, the Q frequency-domain base vector groups are in a one-to-one correspondence with the Q combination coefficient groups, thereby facilitating use of different phase quantization precision for corresponding combination coefficient groups based on different degrees of impact of the frequency-domain base vector groups on system performance, and helping achieve a compromise between system performance and reporting overheads. For example, in at least two of the Q combination coefficient groups, in a frequency-domain base vector group corresponding to a combination coefficient group, sum of amplitude value(s), a maximum amplitude value, and a sum of power of each frequency-domain base vector are all larger, and a phase quantization bit quantity and a phase quantization rule that are used by the combination coefficient group correspond to a quantization method with higher quantization precision; and in a frequency-domain base vector group corresponding to another combination coefficient group, sum of amplitude value(s), a maximum amplitude value, or a sum of power of each frequency-domain base vector are all smaller, and a phase quantization bit quantity and a phase quantization rule that are used by the combination coefficient group correspond to a quantization method with lower quantization precision, thereby reducing reporting overheads while minimizing a performance loss.

The sum of power of the combination coefficient corresponding to each spatial domain beam base vector or each frequency-domain base vector is a sum of squares of amplitude values of all combination coefficients corresponding to each spatial domain beam base vector or each frequency-domain base vector.

In this implementation, a plurality of frequency-domain base vectors with same amplitude value sums, same maximum amplitude values, or same sums of power may be grouped based on indexes of the plurality of frequency-domain base vectors. For example, in a grouping process, if amplitude value sums, maximum amplitude values, or sums of power that correspond to a plurality of frequency-domain base vectors are the same, based on the quantity of frequency-domain base vectors included in each frequency-domain base vector group, when a part of the plurality of frequency-domain base vectors needs to be grouped into a frequency-domain base vector group with a larger amplitude value sum, a larger maximum amplitude value, or a larger sum of power, and the other part needs to be grouped into a frequency-domain base vector group with a smaller amplitude value sum, a smaller maximum amplitude value, or a smaller sum of power, a part of frequency-domain base vectors with a larger or smaller index may be grouped into the frequency-domain base vector group with the larger amplitude value sum, the larger maximum amplitude value, or the larger sum of power, and the other part may be grouped into the frequency-domain base vector group with the smaller amplitude value sum, the smaller maximum amplitude value, or the smaller sum of power.

Optionally, in the Q combination coefficient groups, sum of amplitude value(s), a maximum amplitude value, and a sum of power of a combination coefficient corresponding to each frequency-domain base vector in a $q_1^{th}$ frequency-domain base vector group corresponding to a $q_1^{th}$ combination coefficient group are respectively greater than sum of amplitude value(s), a maximum amplitude value, and a sum of power of a combination coefficient corresponding to any frequency-domain base vector in a $q_2^{th}$ frequency-domain base vector group corresponding to a $q_2^{th}$ combination coefficient group; a phase quantization bit quantity $B_{q1}$ used by each combination coefficient in the $q_1^{th}$ combination coefficient group is greater than a phase quantization bit quantity $B_{q2}$ used by each combination coefficient in the $q_2^{th}$ combination coefficient group; $q_1$ is not equal to $q_2$; and $q_1$ and $q_2$ are integers greater than or equal to 1 and less than or equal to Q. It can be understood that, in this implementation, a larger amplitude value sum, a larger maximum amplitude value, or a larger sum of power that corresponds to each frequency-domain base vector in a frequency-domain base vector group indicates greater impact of the frequency-domain base vector group on system performance Therefore, use of a larger phase quantization bit quantity by the frequency-domain base vector group can reduce a system performance loss. In addition, a smaller amplitude value sum, a smaller maximum amplitude value, or a smaller sum of power that corresponds to each frequency-domain base vector in a frequency-domain base vector group indicates less impact of the frequency-domain base vector group on system performance. Therefore, use of a smaller phase quantization bit quantity by the frequency-domain base vector group can reduce reporting overheads. Therefore, in this implementation, a compromise between minimization of the system performance loss and reduction of the reporting overheads can be achieved.

In still another optional implementation, the transmit end determines, in the K combination coefficients, one or more combination coefficients corresponding to each of l spatial domain beam base vectors, where l is a positive integer less than or equal to L; for the one or more combination coefficients corresponding to each spatial domain beam base vector, the transmit end groups the one or more combination coefficients based on a descending order or ascending order of an amplitude value of each combination coefficient, to obtain the Q combination coefficient groups corresponding to each spatial domain beam base vector; and the transmit end combines a $q^{th}$ combination coefficient group corresponding to each of the l spatial domain beam base vectors, to obtain a $q^{th}$ combination coefficient group in the Q combination coefficient groups of the K combination coefficients, where q is an integer equal to 1, 2, . . . , or Q. That the $q^{th}$ combination coefficient group corresponding to each spatial domain beam base vector is combined means that a union set of a combination coefficient included in the $q^{th}$ combination coefficient group corresponding to each spatial domain beam base vector is obtained, and is used as the $q^{th}$ combination coefficient group in the Q combination coefficient groups of the K combination coefficients. In other words, the $q^{th}$ combination coefficient group in the Q combination coefficient groups of the K combination coefficients includes the $q^{th}$ combination coefficient group corresponding to each spatial domain beam base vector.

It can be understood that this implementation facilitates use of different phase quantization precision based on different degrees of impact of different combination coefficient groups on performance, and further helps reduce reporting overheads while minimizing a performance loss. For example, in at least two of the Q combination coefficient groups of the K combination coefficients, a minimum amplitude value, sum of amplitude value(s), and a maximum amplitude value of a combination coefficient group corresponding to each spatial domain beam base vector in the combination coefficient groups are all larger, and a phase quantization bit quantity and a phase quantization rule that are used by the combination coefficient group correspond to a quantization method with higher quantization precision; and a minimum amplitude value, sum of amplitude value(s), and a maximum amplitude value of another combination coefficient group corresponding to each spatial domain beam base vector in the combination coefficient groups are all smaller, and a phase quantization bit quantity and a phase quantization rule that are used by the combination coefficient group correspond to a quantization method with lower quantization precision, thereby reducing reporting overheads while minimizing a performance loss.

Quantities of combination coefficients included in all of the Q combination coefficient groups corresponding to each spatial domain beam base vector may be the same, or may be different.

In this implementation, in a process of determining the Q combination coefficient groups corresponding to each spatial domain beam base vector, a plurality of combination coefficients with same amplitude values may be grouped based on indexes of frequency-domain base vectors corresponding to the plurality of combination coefficients. For example, in a grouping process, if amplitude values of a plurality of combination coefficients are the same, based on the quantity of combination coefficients included in each combination coefficient group, when a part of the plurality of combination coefficients needs to be grouped into a combination coefficient group with a larger amplitude value, and the other part needs to be grouped into a combination coefficient group with a smaller amplitude value, a part of combination coefficients with a larger or smaller index of a corresponding frequency-domain beam base vector in the plurality of combination coefficients may be grouped into the combination coefficient group with the larger amplitude value, and the other part may be grouped into the combination coefficient group with the smaller amplitude value.

Optionally, in the Q combination coefficient groups corresponding to each spatial domain beam base vector, a minimum amplitude value, a maximum amplitude value, or sum of amplitude value(s) of a $q_1^{th}$ combination coefficient group is greater than a minimum amplitude value, a maximum amplitude value, or sum of amplitude value(s) of a $q_2^{th}$ combination coefficient group; in the Q combination coefficient groups of the K combination coefficients, a phase quantization bit quantity $B_{q1}$ used by the $q_1^{th}$ combination coefficient group is greater than a phase quantization bit quantity $B_{q2}$ used by the $q_2^{th}$ combination coefficient group; $q_1$ is not equal to $q_2$; and $q_1$ and $q_2$ are integers greater than or equal to 1 and less than or equal to Q. It can be understood that, in this implementation, if a combination coefficient group corresponding to each spatial domain beam base vector included in the combination coefficient groups is a combination coefficient group with a larger maximum amplitude value, a larger minimum amplitude value, or a larger amplitude value sum, it indicates that the combination coefficient group has greater impact on system performance, and use of a larger phase quantization bit quantity for the combination coefficient group can minimize a system performance loss. In addition, if a combination coefficient group corresponding to each spatial domain beam base vector included in the combination coefficient groups is a combination coefficient group with a smaller maximum amplitude value, a smaller minimum amplitude value, or a smaller amplitude value sum, it indicates that the combination coefficient group has less impact on system performance, and use of a smaller phase quantization bit quantity for the combination coefficient group can reduce reporting overheads, thereby achieving a compromise between minimization of the system performance loss and reduction of the reporting overheads.

In an optional implementation, the amplitude value of each of the K combination coefficients is determined by performing quantization based on a preset quantization rule by using a quantization bit quantity $A_1$, and $A_1$ is an integer greater than or equal to 2.

In another optional implementation, the amplitude value of each of the K combination coefficients is determined with reference to an average amplitude value or a maximum amplitude value of each spatial domain beam base vector corresponding to each combination coefficient and by performing differential quantization by using a quantization bit quantity $A_3$; $A_3$ is an integer greater than or equal to 1; and the average amplitude value or the maximum amplitude value of each spatial domain beam base vector is an average amplitude value or a maximum amplitude value of one or more combination coefficients corresponding to each spatial domain beam base vector in the K combination coefficients; and the average amplitude value or the maximum amplitude value corresponding to each spatial domain beam base vector is determined by performing quantization by using an amplitude quantization bit quantity $A_2$, and $A_2$ is an integer greater than or equal to 2.

Correspondingly, the precoding matrix indication information further includes an average amplitude value or a maximum amplitude value corresponding to each of the l spatial domain beam base vector; l is a positive integer less than or equal to L; and the l spatial domain beam base vectors are spatial domain beam base vectors corresponding to all of the K combination coefficients.

Optionally, the phase value of each combination coefficient in each combination coefficient group may be determined with reference to a phase value of a combination coefficient with a largest amplitude value in the combination coefficient group and by performing differential quantization by using a phase quantization bit quantity corresponding to the combination coefficient group. Correspondingly, the precoding matrix indication information further includes the phase value of the combination coefficient with the largest amplitude value in each combination coefficient group, the phase value of the combination coefficient with the largest amplitude value in each combination coefficient group is determined by performing quantization by using a phase quantization bit quantity $B_1$, and $B_1$ is an integer greater than or equal to 2.

In an optional implementation, to enable the receive end to preferentially determine the grouping status of the combination coefficients based on the amplitude value of each combination coefficient, and further determine the phase quantization bit quantity and the phase quantization rule that are used by each combination coefficient group, a manner of predefining or notifying by a base station may be used. In this way, the transmit end and the receive end can learn of an arrangement manner of content such as the amplitude values and the phase values of the combination coefficients in the precoding indication information.

For example, in the precoding matrix indication information, the amplitude values of all of the K combination coefficients are located before the phase values of all the combination coefficients, that is, the amplitude values of all of the K combination coefficients are located in high-order bits, and the phase values of all of the K combination coefficients are located in low-order bits; in the precoding matrix indication information, the amplitude values of all of the K combination coefficients are sequentially arranged based on a descending order or ascending order of indexes of the spatial domain beam base vectors corresponding to the combination coefficients or indexes of the frequency-domain base vectors corresponding to the combination coefficients; and in the precoding matrix indication information, the phase values of all of the K combination coefficients are sequentially arranged based on a descending order or ascending order of indexes of the spatial domain beam base vectors corresponding to the combination coefficients or indexes of the frequency-domain base vectors corresponding to the combination coefficients; or in the precoding matrix indication information, for the Q combination coefficient groups to which the K combination coefficients respectively belong, phase values of the combination coefficient groups are sequentially arranged based on a descending order or ascending order of indexes of the combination coefficient groups; and in a phase indication of each combination coefficient group, phase indications of combination coefficients are sequentially arranged based on a descending order or ascending order of indexes of spatial domain beam base vectors corresponding to the combination coefficients or indexes of frequency-domain base vectors corresponding to the combination coefficients.

Correspondingly, in the precoding matrix indication information, the average amplitude values or the maximum amplitude values corresponding to all of the l spatial domain beam base vectors are located before the amplitude values of all of the K combination coefficients, that is, the average amplitude values or the maximum amplitude values corresponding to all of the l spatial domain beam base vectors are located in high-order bits, and the amplitude values of all of the K combination coefficients are located in low-order bits; and in the precoding matrix indication information, the average amplitude values or the maximum amplitude values corresponding to the spatial domain beam base vectors are arranged based on a descending order or ascending order of indexes of the spatial domain beam base vectors.

According to a second aspect, the embodiments further provide a precoding matrix indication method. In the method, a receive end receives precoding matrix indication information, where the precoding matrix indication information includes an amplitude value and a phase value of each of K combination coefficients; and the receive end determines the amplitude value and the phase value of each of the K combination coefficients based on the precoding matrix indication information, where the amplitude value of each combination coefficient is determined by using a same amplitude quantization bit quantity and a same amplitude quantization rule; K is a positive integer less than or equal to L*M; L is a total quantity of spatial domain beam base vectors that is determined by the transmit end; and M is a total quantity of frequency-domain base vectors that is determined by the transmit end; and Q combination coefficient groups to which the K combination coefficients respectively belong are obtained through grouping based on the amplitude values of the K combination coefficients; the phase value of each combination coefficient is determined based on a phase quantization bit quantity and a phase quantization rule that are used by a combination coefficient group to which each combination coefficient belongs; and phase quantization bit quantities and/or phase quantization rules used by at least two of the Q combination coefficient groups are different.

In an optional implementation, the Q combination coefficient groups to which the K combination coefficients respectively belong are obtained by grouping the K combination coefficients based on a descending order or ascending order of the amplitude values of all of the K combination coefficients.

Optionally, in the Q combination coefficient groups, a minimum amplitude value, a maximum amplitude value, or sum of amplitude value(s) of combination coefficients in a $q_1^{th}$ combination coefficient group is greater than a minimum amplitude value, a maximum amplitude value, or sum of amplitude value(s) of combination coefficients in a $q_2^{th}$ combination coefficient group; a phase quantization bit quantity $B_{q1}$ used by the combination coefficients in the $q_1^{th}$ combination coefficient group is greater than a phase quantization bit quantity $B_{q2}$ used by the combination coefficients in the $q_2^{th}$ combination coefficient group; $q_1$ is not equal to $q_2$; and $q_1$ and $q_2$ are integers greater than or equal to 1 and less than or equal to Q.

In another optional implementation, each of the Q combination coefficient groups to which the K combination coefficients respectively belong includes all combination coefficients corresponding to spatial domain beam base vectors in each of Q spatial domain beam base vector groups; the Q spatial domain beam base vector groups are obtained by grouping l spatial domain beam base vectors based on a descending order or ascending order of sum of amplitude value(s), a maximum amplitude value, or a sum of power of one or more combination coefficients corresponding to each of the l spatial domain beam base vectors in the K combination coefficients; and l is a positive integer less than or equal to L.

Optionally, in this implementation, in the Q combination coefficient groups, sum of amplitude value(s), a maximum amplitude value, and a sum of power of a combination coefficient corresponding to each spatial domain beam base vector in a $q_1^{th}$ spatial domain beam base vector group corresponding to a $q_1^{th}$ combination coefficient group are respectively greater than sum of amplitude value(s), a maximum amplitude value, and a sum of power of a combination coefficient corresponding to any spatial domain beam base vector in a $q_2^{th}$ spatial domain beam base vector group corresponding to a $q_2^{th}$ combination coefficient group; a phase quantization bit quantity $B_{q1}$ used by each combination coefficient in the $q_1^{th}$ combination coefficient group is greater than a phase quantization bit quantity $B_{q2}$ used by each combination coefficient in the $q_2^{th}$ combination coefficient group; $q_1$ is not equal to $q_2$; and $q_1$ and $q_2$ are integers greater than or equal to 1 and less than or equal to Q.

In still another optional implementation, each of the Q combination coefficient groups to which the K combination coefficients respectively belong includes all combination coefficients corresponding to frequency-domain base vectors in each of the Q frequency-domain base vector groups; the Q frequency-domain base vector groups are obtained by grouping the M frequency-domain base vectors based on a descending order or ascending order of sum of amplitude value(s), a maximum amplitude value, or a sum of power of one or more combination coefficients corresponding to each of m frequency-domain base vectors in the K combination coefficients; and m is a positive integer less than or equal to M.

Optionally, in this implementation, sum of amplitude value(s), a maximum amplitude value, and a sum of power of a combination coefficient corresponding to each frequency-domain base vector in a $q_1^{th}$ frequency-domain base vector group corresponding to a $q_1^{th}$ combination coefficient group are respectively greater than sum of amplitude value(s), a maximum amplitude value, and a sum of power of a combination coefficient corresponding to any frequency-domain base vector in a $q_2^{th}$ frequency-domain base vector group corresponding to a $q_2^{th}$ combination coefficient group; a phase quantization bit quantity $B_{q1}$ used by each combination coefficient in the $q_1^{th}$ combination coefficient group is greater than a phase quantization bit quantity $B_{q2}$ used by each combination coefficient in the $q_2^{th}$ combination coefficient group; $q_1$ is not equal to $q_2$; and $q_1$ and $q_2$ are integers greater than or equal to 1 and less than or equal to Q.

In still another optional implementation, a $q^{th}$ combination coefficient group in the Q combination coefficient groups to which the K combination coefficients respectively belong is obtained by combining combination coefficient(s)

in a $q^{th}$ combination coefficient group in Q combination coefficient groups corresponding to each of l spatial domain beam base vectors; l is a positive integer less than or equal to L; and q is an integer equal to 1, 2, . . . , or Q; and the Q combination coefficient groups corresponding to each of the l spatial domain beam base vectors are obtained by grouping, for one or more combination coefficients corresponding to each spatial domain beam base vector, the one or more combination coefficients based on a descending order or ascending order of an amplitude value of each combination coefficient.

Optionally, in this implementation, in the Q combination coefficient groups corresponding to each spatial domain beam base vector, a minimum amplitude value, a maximum amplitude value, or sum of amplitude value(s) of a $q_1^{th}$ combination coefficient group is greater than a minimum amplitude value, a maximum amplitude value, or sum of amplitude value(s) of a $q_2^{th}$ combination coefficient group; in the Q combination coefficient groups of the K combination coefficients, a phase quantization bit quantity $B_{q1}$ used by the $q_1^{th}$ combination coefficient group is greater than a phase quantization bit quantity $B_{q2}$ used by the $q_2^{th}$ combination coefficient group; $q_1$ is not equal to $q_2$; and $q_1$ and $q_2$ are integers greater than or equal to 1 and less than or equal to Q.

In an optional implementation, the amplitude value of each of the K combination coefficients is determined by performing quantization by using a quantization bit quantity $A_1$, and $A_1$ is an integer greater than or equal to 2.

In addition, the phase value of each combination coefficient in each combination coefficient group is determined by performing quantization by using a phase quantization bit quantity corresponding to the combination coefficient group.

In another optional implementation, the amplitude value of each of the K combination coefficients is determined with reference to an average amplitude value or a maximum amplitude value of each spatial domain beam base vector corresponding to each combination coefficient and by performing differential quantization by using a quantization bit quantity $A_3$; $A_3$ is an integer greater than or equal to 1; and the average amplitude value or the maximum amplitude value of each spatial domain beam base vector is an average amplitude value or a maximum amplitude value of one or more combination coefficients corresponding to each spatial domain beam base vector in the K combination coefficients; and the average amplitude value or the maximum amplitude value corresponding to each spatial domain beam base vector is determined by performing quantization by using an amplitude quantization bit quantity $A_2$, and $A_2$ is an integer greater than or equal to 2.

Optionally, the phase value of each combination coefficient in each combination coefficient group may be determined with reference to a phase value of a combination coefficient with a largest amplitude value in the combination coefficient group and by performing differential quantization by using a phase quantization bit quantity corresponding to the combination coefficient group. Correspondingly, the precoding matrix indication information further includes the phase value of the combination coefficient with the largest amplitude value in each combination coefficient group, the phase value of the combination coefficient with the largest amplitude value in each combination coefficient group is determined by performing quantization by using a phase quantization bit quantity B, and B is an integer greater than or equal to 2.

In an optional implementation, in the precoding matrix indication information, the amplitude values of all of the K combination coefficients are located before the phase values of all the combination coefficients; in the precoding matrix indication information, the amplitude values of all of the K combination coefficients are sequentially arranged based on a descending order or ascending order of indexes of the spatial domain beam base vectors corresponding to the combination coefficients or indexes of the frequency-domain base vectors corresponding to the combination coefficients; and in the precoding matrix indication information, the phase values of all of the K combination coefficients are sequentially arranged based on a descending order or ascending order of indexes of the spatial domain beam base vectors corresponding to the combination coefficients or indexes of the frequency-domain base vectors corresponding to the combination coefficients; or in the precoding matrix indication information, for the Q combination coefficient groups to which the K combination coefficients respectively belong, phase values of the combination coefficient groups are sequentially arranged based on a descending order or ascending order of indexes of the combination coefficient groups; and in a phase indication of each combination coefficient group, phase indications of combination coefficients are sequentially arranged based on a descending order or ascending order of indexes of spatial domain beam base vectors corresponding to the combination coefficients or indexes of frequency-domain base vectors corresponding to the combination coefficients.

In an optional implementation, the precoding matrix indication information further includes an average amplitude value or a maximum amplitude value corresponding to each of the l spatial domain beam base vector; l is a positive integer less than or equal to L; and the l spatial domain beam base vectors are spatial domain beam base vectors corresponding to all of the K combination coefficients; the amplitude value of each of the K combination coefficients is determined with reference to an average amplitude value or a maximum amplitude value of each spatial domain beam base vector corresponding to each combination coefficient and by performing differential quantization by using a quantization bit quantity $A_3$; $A_3$ is an integer greater than or equal to 1; and the average amplitude value or the maximum amplitude value of each spatial domain beam base vector is an average amplitude value or a maximum amplitude value of one or more combination coefficients corresponding to each spatial domain beam base vector in the K combination coefficients; and the average amplitude value or the maximum amplitude value corresponding to each spatial domain beam base vector is determined by performing quantization by using an amplitude quantization bit quantity $A_2$, and $A_2$ is an integer greater than or equal to 2.

Correspondingly, in the precoding matrix indication information, the average amplitude values or the maximum amplitude values corresponding to all of the l spatial domain beam base vectors are located before the amplitude values of all of the K combination coefficients; and the average amplitude values or the maximum amplitude values corresponding to the spatial domain beam base vectors are arranged based on a descending order or ascending order of indexes of the spatial domain beam base vectors.

According to a third aspect, an embodiment further provides a device. The device has some or all of functions of the transmit end for implementing the example of the precoding matrix indication method according to the first aspect. For example, the device may have functions in some or all of embodiments, or may have a function of separately implementing any one of embodiments. The function may be implemented by hardware, or may be implemented by hardware by executing corresponding software. The hardware or the software includes one or more units or modules corresponding to the foregoing function.

In a possible implementation, a structure of the device may include a processing unit and a communications unit. The processing unit is configured to support the transmit end in performing a corresponding function in the foregoing method. The communications unit is configured to support communication between the device and another device. The transmit end may further include a storage unit. The storage unit is configured to be coupled to the processing unit, and stores program instructions and data that are necessary for a terminal device. In an example, the processing unit may be a processor, the communications unit may be a transceiver, and the storage unit may be a memory.

According to a fourth aspect, an embodiment further provides a device. The device has some or all of functions of the receive end for implementing the example of the precoding matrix indication method according to the second aspect. For example, the function of the device may have functions in some or all of embodiments, or may have a function of separately implementing any one of embodiments. The function may be implemented by hardware, or may be implemented by hardware by executing corresponding software. The hardware or the software includes one or more units or modules corresponding to the foregoing function.

In a possible implementation, a structure of the device includes a processing unit and a communications unit. The processing unit is configured to support the receive end in performing a corresponding function in the foregoing method. The communications unit is configured to support communication between the device and another device. The device may further include a storage unit. The storage unit is configured to be coupled to the processing unit, and stores program instructions and data that are necessary for the device. In an example, the processing unit may be a processor, the communications unit may be a transceiver, and the storage unit may be a memory.

According to a fifth aspect, an embodiment provides a communications system. The system includes the transmit end and the receive end according to the foregoing aspects. In another possible implementation, the system may further include another device that interacts with the transmit end and/or the receive end in the solutions provided in the embodiments.

According to a sixth aspect, an embodiment provides a computer storage medium, configured to store computer software instructions used by the transmit end, and including a program designed to perform the precoding matrix indication method according to the first aspect.

According to a seventh aspect, an embodiment provides a computer storage medium, configured to store computer software instructions used by the receive end, and including a program designed to perform the precoding matrix indication method according to the second aspect.

According to an eighth aspect, the embodiments further provide a computer program product including instructions. When the computer program product runs on a computer, the computer is enabled to perform the method according to the first aspect or the second aspect.

According to a ninth aspect, the embodiments provide a chip system. The chip system includes a processor, configured to support a transmit end in implementing the function in the foregoing aspect, for example, determining or processing data and/or information in the foregoing method. In a possible implementation, the chip system further includes a memory. The memory is configured to store program instructions and data that are necessary for the transmit end. The chip system may include a chip, or may include a chip and another discrete component.

According to a tenth aspect, the embodiments provide a chip system. The chip system includes a processor, configured to support a receive end in implementing the function in the foregoing aspect, for example, generating or processing data and/or information in the foregoing method. In a possible implementation, the chip system further includes a memory. The memory is configured to store program instructions and data that are necessary for the receive end. The chip system may include a chip, or may include a chip and another discrete component.

DETAILED DESCRIPTION OF THE EMBODIMENTS

Figure 1:
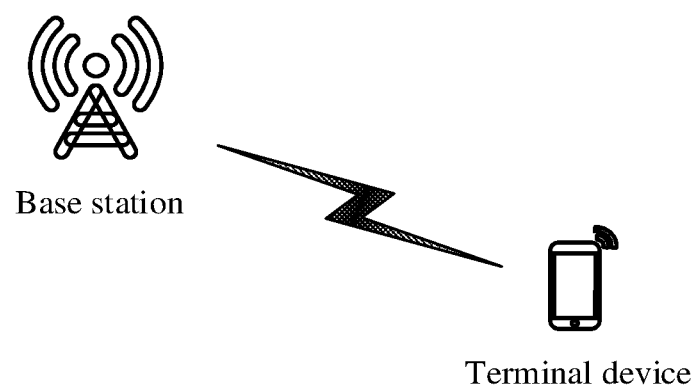
FIG. 1 is a schematic structural diagram of a communications system according to an embodiment.

The following describes the embodiments with reference to the accompanying drawings.

The terms "first", "second", and the like are intended to distinguish between different objects but do not indicate a particular order. In addition, the terms "including", "having", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The solutions in the embodiments may be applied to various communications systems, for example, a global system for mobile communications (GSM) system, a code division multiple access (CDMA) system, a wideband code division multiple access (WCDMA) system, a time division-synchronous code division multiple access (-SCDMA) system, a universal mobile telecommunications system (UMTS), and a long term evolution (LTE) system. With continuous development of communications technologies, the solutions in the embodiments may be further applied to a future network, for example, a 5G system, which may also be referred to as a new radio (NR) system, or the solutions may be applied to a device to device (D2D) system, a machine to machine (M2M) system, or the like.

A receive end in the embodiments may be an entity configured to send or receive information on a network side, for example, may be a base station, a transmission point (TP), a transmission reception point (TRP), a relay device, or another network device that has a base station function. This is not limited.

A transmit end in the embodiments may be a device having a communication function, and may include a handheld device having a wireless communication function, a vehicle-mounted device, a wearable device, a computing device, another processing device connected to a wireless modem, or the like. A terminal device may have different names in different networks, for example, a terminal device, user equipment (UE), a mobile station, a subscriber unit, a relay, a station, a cellular phone, a personal digital assistant, a wireless modem, a wireless communications device, a handheld device, a laptop computer, a cordless phone, and a wireless local loop station. The terminal device may be a wireless terminal device or a wired terminal device. The wireless terminal device may be a device that provides a user with voice and/or data connectivity, a handheld device having a wireless connection function, or another processing device connected to a wireless modem, and may communicate with one or more core networks by using a radio access network (RAN).

First, a to-be-resolved problem and an application scenario of the embodiments are described.

Currently, in a massive multiple input multiple output (Massive MIMO) system, spectral efficiency can be significantly improved by using a large-scale antenna, and accuracy of channel state information obtained by a base station determines performance of massive MIMO to a great extent. Therefore, a codebook is usually used to quantize the channel state information. When the codebook is used to quantize the channel state information, an original channel feature needs to be approximated as much as possible with allowable overheads, so that channel quantization is more accurate.

A significant performance advantage may be obtained by performing linear combination on a plurality of orthogonal beams by using a high-precision codebook. For example, in a downlink system, a precoding matrix W that corresponds to one frequency-domain unit and that is fed back by a terminal device is formed by performing linear combination on a plurality of selected orthogonal beams:

$$W = W_1 * W_2 \quad (1)$$

W is a target precoding matrix corresponding to the frequency-domain unit, and when a quantity of spatial layers is 1, dimensions are 2N1N2*1. N1 represents a quantity of antenna ports in a horizontal direction, and N2 represents a quantity of antenna ports in a vertical direction. $W_1$ is a spatial domain beam base vector matrix including L spatial domain beam base vectors. The L spatial domain beam base vectors may be obtained by selecting L/2 spatial domain beam base vectors from a spatial domain beam base matrix and performing dual-polarization rotation on the L/2 spatial domain beam base vectors, that is, L/2 same spatial domain beam base vectors are selected in the two polarization directions. The spatial domain beam base matrix may be a predefined discrete Fourier transform (Discrete Fourier transform, DFT) matrix.

$$W_1 [\, b_{ls(1)} \quad b_{ls(2)} \quad \cdots \quad b_{ls(i)} \quad \cdots \quad b_{ls(L)} \,] \quad (2)$$

ls(i) where (i=1, 2, ... L) corresponds to L spatial domain beam base vectors, and ls(i) represents an index of an $i^{th}$ spatial domain beam base vector.

$W_2$ is a combination coefficient matrix, and when the quantity of spatial layers is 1, the combination coefficient matrix $W_2$ may be:

$$W_2 = \begin{bmatrix} p_1 \varphi_1 \\ p_2 \varphi_2 \\ \vdots \\ p_i \varphi_i \\ \vdots \\ p_L \varphi_L \end{bmatrix} \quad (3)$$

$p_i$ represents an amplitude value of a combination coefficient corresponding to the $i^{th}$ spatial domain beam base vector on a measured precoding matrix index (PMI) frequency-domain unit, and $\varphi_i$ represents a phase value of the combination coefficient corresponding to the $i^{th}$ spatial domain beam base vector on the measured PMI frequency-domain unit. A frequency-domain length of the PMI frequency-domain unit may be a bandwidth corresponding to a frequency-domain subband, or may be 1/R times of a frequency-domain subband bandwidth, where R=2 or 4, or may be one, two, or four resource blocks (RB). i=1, 2, ... L.

According to the foregoing formula (1) to formula (3), the precoding matrix W fed back by the terminal device may be:

$$W = [\, b_{ls(1)} \quad b_{ls(2)} \quad \cdots \quad b_{ls(i)} \quad \cdots \quad b_{ls(L)} \,] \begin{bmatrix} p_1 \varphi_1 \\ p_2 \varphi_2 \\ \vdots \\ p_i \varphi_i \\ \vdots \\ p_L \varphi_L \end{bmatrix} \quad (4)$$

It can be understood that the foregoing formula (4) is used to quantize the channel state information, and the foregoing precoding matrix is reported to a base station. This helps the base station obtain an approximately optimal precoding matrix. However, the foregoing precoding matrix improves performance, but also causes huge precoding matrix indication overheads, for example, in the precoding matrix, amplitude values and phase values of L combination coefficients corresponding to each PMI frequency-domain unit need to be reported. Especially, a larger quantity of PMI frequency-domain units indicates a larger quantity of combination coefficients that need to be reported. For example, if a quantity of PMI frequency-domain units is N, a combination coefficient matrix is $\tilde{W}_2 = [W_2^{(1)} \ldots W_2^{(N)}]_{L*N}$, and a quantity of combination coefficients that need to be reported reaches L*N. This causes huge reporting overheads.

To resolve this problem, based on an idea of frequency domain compression, M frequency-domain base vectors are selected from a frequency-domain base matrix $W_{freq}$, and $\tilde{W}_2$ is transformed into $\tilde{W}_2 = \tilde{W} W_3$, so that the precoding matrix W corresponding to the N frequency-domain units may be further expressed as $W = W_1 \tilde{W} W_3$. W is a joint precoding matrix including the precoding matrix corresponding to the N PMI frequency-domain units, and has dimensions of 2N1N2*N. In this way, as shown in a formula (5), $W_3$ is a frequency-domain base vector matrix whose dimensions are M*N and that includes M frequency-domain base vectors selected from a frequency-domain base matrix;

N is a quantity of measured PMI frequency-domain units; and $\tilde{W}$ is a combination coefficient matrix whose dimensions are L*M and that corresponds to linear combination performed on spatial domain beam base vectors and frequency-domain base vectors.

$$W_3 = \begin{bmatrix} b_{f(0)} \\ b_{f(1)} \\ \vdots \\ b_{f(M-1)} \end{bmatrix}_{M*N} \quad (5)$$

$$\tilde{W} = \begin{bmatrix} p_{1,1}\varphi_{1,1} & p_{1,2}\varphi_{1,2} & \cdots & p_{1,j}\varphi_{1,j} & \cdots & p_{1,M}\varphi_{1,M} \\ p_{2,1}\varphi_{2,1} & p_{2,2}\varphi_{2,2} & \cdots & p_{2,j}\varphi_{2,j} & \cdots & p_{2,M}\varphi_{1,M} \\ \vdots & \vdots & \vdots & \vdots & \vdots & \vdots \\ p_{i,1}\varphi_{i,1} & p_{i,2}\varphi_{i,2} & \cdots & p_{i,j}\varphi_{i,j} & \cdots & p_{i,M}\varphi_{i,M} \\ \vdots & \vdots & \vdots & \vdots & \vdots & \vdots \\ p_{L,1}\varphi_{L,1} & p_{L,2}\varphi_{L,2} & & p_{L,j}\varphi_{L,j} & & p_{L,M}\varphi_{L,M} \end{bmatrix}_{L*M}$$

$p_{i,j}$ represents an amplitude value of a combination coefficient corresponding to linear combination performed on the $i^{th}$ spatial domain beam base vector and a $j^{th}$ frequency-domain base vector, and $\varphi_{i,j}$ represents a phase value of the combination coefficient corresponding to linear combination performed on the $i^{th}$ spatial domain beam base vector and the $j^{th}$ frequency-domain base vector. i=1, 2, . . . L, and j=1, 2, . . . M.

For ease of description, $p_{i,j} \varphi_{i,j}$ is subsequently described as the combination coefficient corresponding to the $i^{th}$ beam base vector or the $j^{th}$ frequency-domain base vector. In other words, the combination coefficient corresponding to the $i^{th}$ spatial domain beam base vector includes $\{p_{i,j}\varphi_{i,j}, j=1, 2, \ldots M\}$, and correspondingly, the combination coefficient corresponding to the $j^{th}$ frequency-domain base vector includes $\{p_{i,j}\varphi_{i,j}, i=1, 2, \ldots L\}$.

It can be understood that the terminal device only needs to feed back indexes of the L/2 selected spatial domain beam base vectors, indexes of the M frequency-domain base vectors, and amplitude values and phase values of L*M combination coefficients in $\tilde{W}$ based on the measured channel state information, and the base station may obtain, based on the information that is fed back, a precoding matrix quantized based on the channel state information.

If same amplitude quantization precision and same phase quantization precision are simply used to feed back the combination coefficients, for example, a total quantity of used amplitude quantization bits and phase quantization bits is X, reporting overheads required for the L*M combination coefficients are L*M*X. It can be understood that, to minimize a performance loss caused by quantization, a larger quantization bit quantity is preferred. However, reporting overheads increase linearly.

To significantly reduce the reporting overheads caused by the L*M combination coefficients while ensuring minimization of the performance loss, this embodiment provides a precoding matrix indication method. The precoding matrix indication method is proposed for how to reduce the reporting overheads required for the L*M combination coefficients. In other words, how to report the L*M combination coefficients with as low overheads as possible while ensuring minimization of the performance loss is a problem that needs to be resolved in this embodiment.

Optionally, to report the amplitude values and the phase values of the L*M combination coefficients, if a strongest combination coefficient in the L*M combination coefficients is used to perform normalization processing on $\tilde{W}$, only an index of the strongest combination coefficient and amplitude values and phase values of remaining L*M−1 combination coefficients need to be reported. The strongest combination coefficient is a combination coefficient with a largest amplitude value in the L*M combination coefficients. The combination coefficient matrix $\tilde{W}$ is determined when a quantity of paths of data that can be transmitted in parallel in the MIMO system is 1, that is, the quantity of spatial layers is 1, and the quantity of spatial layers is determined by calculating a rank of a measured equivalent channel matrix. Optionally, for a channel with a quantity of paths of data for parallel transmission being 2, a process of determining a combination coefficient matrix is similar to that in the foregoing content, and a difference lies in that each spatial layer corresponds to one precoding matrix, and therefore, one combination coefficient matrix $\tilde{W}$ needs to be determined for each spatial layer. In other words, in this embodiment, a same precoding matrix indication method may be used for each spatial layer, to report a combination coefficient corresponding to each spatial layer. In addition, for different spatial layers, a same spatial domain beam base vector and a same frequency-domain base vector may be used for linear combination, or different spatial domain beam base vectors and different frequency-domain base vectors may be used for linear combination.

Optionally, the precoding matrix indication method in the embodiments may be applied to the downlink system. The terminal device performs a related operation of a transmit end in this embodiment, and the base station performs a related operation of a receive end in this embodiment. Both L and M are predefined or notified by using signaling to the terminal device by a network device side, for example, the base station. The spatial domain base matrix and the frequency-domain base matrix are matrices that are known to both the base station and the terminal device and that are the same for both the base station and the terminal device. Therefore, the terminal device may report the indexes of the L/2 selected spatial domain beam base vectors and the indexes of the M frequency-domain base vectors.

The following describes the precoding matrix indication method in the embodiments with reference to a communications system shown in FIG. 1. As shown in FIG. 1, a transmit end is a device that sends precoding indication information. The transmit end may be a terminal device, and a receive end may be a base station. Optionally, the communications system may include one or more base stations and one or more terminal devices.

Figure 2:
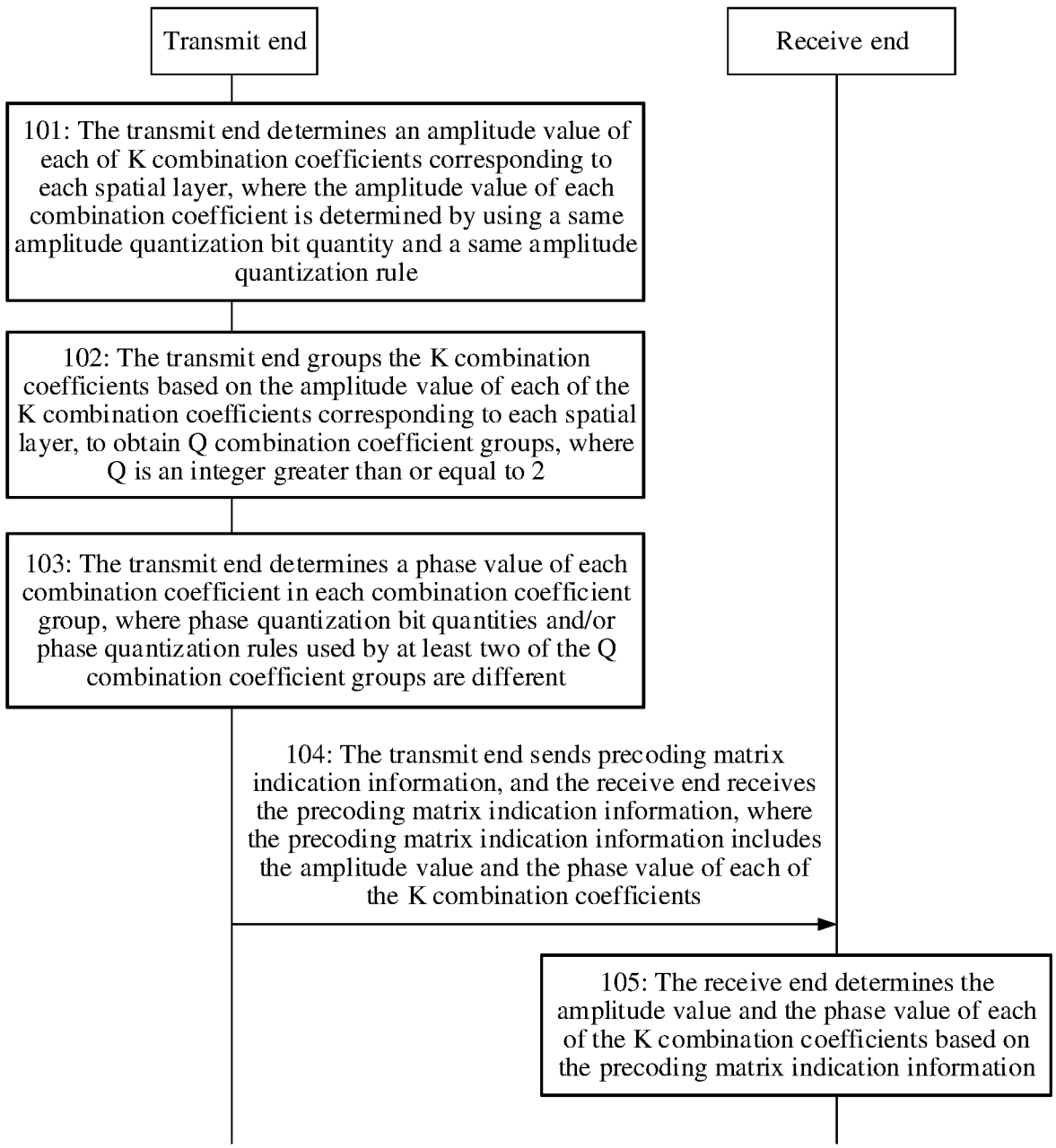
FIG. 2 is a schematic flowchart of a precoding indication method according to an embodiment.

FIG. 2 is a schematic flowchart of a precoding matrix indication method according to an embodiment of this embodiment. As shown in FIG. 2, a manner of feeding back an amplitude value and a phase value of a combination coefficient in the precoding matrix indication method may include the following steps.

101: A transmit end determines an amplitude value of each of K combination coefficients corresponding to each spatial layer, where the amplitude value of each combination coefficient is determined by using a same amplitude quantization bit quantity and a same amplitude quantization rule.

The K combination coefficients are selected from L*M combination coefficients corresponding to one spatial layer, that is, K is an integer less than or equal to L*M. The K combination coefficients may also be referred to as a subset of the L*M combination coefficients. A value of K may be configured by a base station, or may be reported by a terminal device based on a channel condition or overheads.

In addition, the transmit end, for example, the terminal device, further needs to report indexes corresponding to the K combination coefficients. The indexes may be indexes of spatial domain beam base vectors corresponding to the K combination coefficients and indexes of frequency-domain base vectors corresponding to the K combination coefficients, or may be indicated by using a bitmap.

102: The transmit end groups the K combination coefficients based on the amplitude value of each of the K combination coefficients corresponding to each spatial layer, to obtain Q combination coefficient groups, where Q is an integer greater than or equal to 2.

It can be understood that, in this embodiment, because each combination coefficient uses a same amplitude quantization bit quantity and a same amplitude quantization rule, a receive end may determine a grouping status of the K combination coefficients based on the amplitude value of each combination coefficient, that is, determine the Q combination coefficient groups. Optionally, a value of Q may be notified by the base station to the terminal device, or may be determined by the terminal device or the base station based on measured channel state information and notified to the base station or the terminal device, or a value of Q is predefined in a protocol.

103: The transmit end determines a phase value of each combination coefficient in each combination coefficient group, where phase quantization bit quantities and/or phase quantization rules used by at least two of the Q combination coefficient groups are different.

For example, phase quantization bit quantities and/or phase quantization rules used by any two combination coefficient groups are different. At least one of a phase quantization bit quantity and a phase quantization rule that are used by at least one combination coefficient group is different from at least one of a phase quantization bit quantity and a phase quantization rule that are used by another combination coefficient group. For example, Q is equal to 3, and phase quantization bit quantities and phase quantization rules that are used by combination coefficient groups 1, 2, and 3 are different; or phase quantization bit quantities used by combination coefficient groups 1, 2, and 3 are the same, but phase quantization rules used by the combination coefficient groups 1, 2, and 3 are different; or phase quantization bit quantities used by combination coefficient groups 1, 2, and 3 are different, but phase quantization rules used by the combination coefficient groups 1, 2, and 3 are the same. For another example, Q is equal to 3, phase quantization bit quantities and phase quantization rules that are used by combination coefficient groups 1 and 2 are the same, but are different from a phase quantization bit quantity and a phase quantization rule that are used by a combination coefficient group 3; or phase quantization bit quantities used by combination coefficient groups 1 and 2 are the same as a phase quantization bit quantity used by a combination coefficient group 3, but phase quantization rules used by the combination coefficient groups 1 and 2 are different from a phase quantization rule used by the combination coefficient group 3; or phase quantization rules used by combination coefficient groups 1 and 2 are the same as a phase quantization rule used by a combination coefficient group 3, but phase quantization bit quantities used by the combination coefficient groups 1 and 2 are different from a phase quantization bit quantity used by the combination coefficient group 3.

104: The transmit end sends precoding matrix indication information, and the receive end receives the precoding matrix indication information, where the precoding matrix indication information includes the amplitude value and the phase value of each of the K combination coefficients.

105: The receive end determines the amplitude value and the phase value of each of the K combination coefficients based on the precoding matrix indication information.

Optionally, the transmit end may further perform normalization processing on the K combination coefficients by using a strongest combination coefficient in the K combination coefficients, where the strongest combination coefficient may be a combination coefficient with a largest amplitude value in the K combination coefficients. In this way, the strongest combination coefficient is 1 after normalization processing, so that the transmit end may report an index of the strongest combination coefficient and amplitude values and phase values of other K−1 combination coefficients. In other words, in 104, the amplitude value and the phase value of each of the K−1 combination coefficients are included.

An amplitude quantization bit quantity and an amplitude quantization rule that are used by each combination coefficient, and the phase quantization bit quantity and the phase quantization rule that are used by each combination coefficient group are known to both the receive end and the transmit end, for example, may be obtained through predefinition or through configuration by the base station in an uplink and downlink system. Optionally, the amplitude quantization rule is how to quantize the amplitude value by using the amplitude quantization bit quantity to obtain a quantized amplitude set, that is, a set including optional quantized amplitude values, so that a closest quantized amplitude value can be selected for an amplitude value that is not quantized, and an index corresponding to the selected quantized amplitude value in the quantized amplitude set is carried in the sent precoding matrix indication information and is used as a to-be-reported amplitude value. In this way, the receive end obtains the quantized amplitude set by using a same amplitude quantization bit quantity and a same amplitude quantization rule, and determines, from the quantized amplitude set based on the reported index, a quantized amplitude value corresponding to the combination coefficient. Similarly, the phase quantization rule corresponding to each combination coefficient group is how to quantize the phase value by using the phase quantization bit quantity, to obtain a quantized phase set, so that a closest quantized phase value can be selected for a phase value that is not quantized, and an index corresponding to the selected quantized phase value in the quantized phase set is carried in the sent precoding matrix indication information and is used as a to-be-reported phase value. In this way, for a same combination coefficient group, the receive end obtains a quantized phase set of the combination coefficient group by using a same phase quantization bit quantity and a same phase quantization rule, and determines a quantized phase value based on the reported index.

In other words, in this embodiment, the combination coefficient in the combination coefficient matrix may be a normalized combination coefficient, or is a combination coefficient including a quantized amplitude value and a quantized phase value. In the precoding matrix indication information, the amplitude value of each combination coefficient is an index corresponding to the quantized amplitude value in a quantized amplitude set, and the phase value of each combination coefficient is an index corresponding to the quantized phase value in a corresponding quantized phase set, and quantized phase sets corresponding to different phase quantization bit quantities are different.

It can be understood that a larger used amplitude quantization bit quantity and a larger used phase quantization bit quantity indicate higher corresponding quantization precision with reference to a quantization rule and indicate that a quantized amplitude value and a quantized phase value are closer to actual values measured in a system, thereby helping minimize a performance loss. However, this causes higher reporting overheads.

In this embodiment, the K combination coefficients are grouped into the Q combination coefficient groups based on the amplitude value of each combination coefficient, so that the phase quantization bit quantities and/or the phase quantization rules used by the at least two of the Q combination coefficient groups are different. For a combination coefficient group having greater impact on performance, for a phase value of each combination coefficient, this facilitates use of a phase quantization bit quantity and a phase quantization rule for high-precision quantization, or use of a phase quantization bit quantity or a phase quantization rule for high-precision quantization. For a combination coefficient group having less impact on performance, for a phase value of each combination coefficient, this facilitates use of a phase quantization bit quantity and a phase quantization rule for low-precision quantization, or use of a phase quantization bit quantity or a phase quantization rule for low-precision quantization. In this way, this helps significantly reduce quantization overheads while minimizing a performance loss.

Compared with the conventional technology in which a same quantization bit quantity and a same quantization rule are used for amplitude values and phase values of all combination coefficients, based on the foregoing concept of a combination coefficient group, this embodiment helps achieve an optimal compromise between performance and overheads.

Compared with the conventional technology in which a low-precision quantization method is used for an amplitude value of a combination coefficient and a high-precision quantization method is used for a phase, this embodiment helps ensure that a high-precision quantization method is used for amplitude values of all combination coefficients, and a low-precision quantization method is used only for a phase value of a combination coefficient group having less impact on system performance, to avoid, to the greatest extent, a performance loss caused by a decrease in quantization precision.

Although a concept of a combination coefficient group is introduced, different quantization precision is used for amplitude values and phase values of the combination coefficient groups. In this way, compared with a manner in which combination coefficient grouping indication information needs to be additionally added to distinguish a grouping status of the combination coefficients, in this embodiment, the same amplitude quantization bit quantity and the same amplitude quantization rule are used for the amplitude values of all the combination coefficients, so that the receive end can determine the grouping status of the combination coefficients based on the amplitude values, and no additional combination coefficient grouping indication information needs to be added, thereby reducing reporting overheads.

The following describes an optional implementation of step 102 of grouping the K combination coefficients based on the amplitude value of each of the K combination coefficients, to obtain the Q combination coefficient groups.

1.1 The K combination coefficients are grouped based on a descending order or ascending order of the amplitude values of all of the K combination coefficients.

In this implementation, the transmit end may group the K combination coefficients based on the descending order or ascending order of the amplitude values of all of the K combination coefficients, to obtain the Q combination coefficient groups. Correspondingly, based on the amplitude values of the combination coefficients in the precoding indication information, the receive end may also obtain the grouping status of the K combination coefficients based on the descending order or ascending order of the amplitude values. In this way, this facilitates use of a smaller phase quantization bit quantity for a combination coefficient group with a smaller amplitude value, and use of a larger phase quantization bit quantity for a combination coefficient group with a larger amplitude value, thereby reducing reporting overheads while minimizing a system performance loss.

Quantities of combination coefficients included in the combination coefficient groups may be the same, or may be different.

In an example, each of the first combination coefficient group to a $(Q-1)^{th}$ combination coefficient group may include $\lfloor K/Q \rfloor$ combination coefficients, and a $Q^{th}$ combination coefficient group includes $K-\lfloor K/Q \rfloor(Q-1)$ combination coefficients. The first combination coefficient group includes $\lfloor K/Q \rfloor$ combination coefficients with largest amplitude values in the K combination coefficients; the $Q^{th}$ combination coefficient group includes $K-\lfloor K/Q \rfloor(Q-1)$ combination coefficients with smallest amplitude values in the K combination coefficients; and if Q is an integer greater than or equal to 3, a $q^{th}$ combination coefficient group includes $\lfloor K/Q \rfloor$ combination coefficients with largest amplitude values other than $\lfloor K/Q \rfloor*(q-1)$ combination coefficients with largest amplitude values in the K combination coefficients, q is an integer greater than 1 and less than Q, and $\lfloor \; \rfloor$ represents a floor operation.

In another example, the quantity of combination coefficients included in each combination coefficient group may be predefined or notified by using signaling. That is, a $q^{th}$ combination coefficient group in the Q combination coefficient groups includes $k_q$ combination coefficients, where q is an integer greater than or equal to 1 and less than or equal to Q, and $k_q$ is predefined or notified by using signaling. Quantities $k_q$ of combination coefficients included in the combination coefficient groups may be the same, or may be different, and $$\sum_{q=1}^{Q} k_q = K.$$

In this way, the first combination coefficient group includes $k_1$ combination coefficients with largest amplitude values in the K combination coefficients; a $Q^{th}$ combination coefficient group includes $k_Q$ combination coefficients with smallest amplitude values in the K combination coefficients; and if Q is an integer greater than or equal to 3, the $q^{th}$ combination coefficient group includes $k_q$ combination coefficients with largest amplitude values other than $$\sum_{q=1}^{q-1} k_q$$

combination coefficients with largest amplitude values in the K combination coefficients.

Optionally, in this implementation, in the Q combination coefficient groups, a minimum amplitude value, a maximum amplitude value, or sum of amplitude value(s) of combination coefficients in a $q_1{}^{th}$ combination coefficient group is greater than a minimum amplitude value, a maximum amplitude value, or sum of amplitude value(s) of combination coefficients in a $q_2{}^{th}$ combination coefficient group; a phase quantization bit quantity $B_{q1}$ used by the combination coefficients in the $q_1{}^{th}$ combination coefficient group is greater than a phase quantization bit quantity $B_{q2}$ used by the combination coefficients in the $q_2{}^{th}$ combination coefficient group; $q_1$ is not equal to $q_2$; and $q_1$ and $q_2$ are integers greater than or equal to 1 and less than or equal to Q. In other words, the K combination coefficients are grouped based on the descending order or ascending order of the amplitude values of all of the K combination coefficients, and a phase quantization bit quantity used by a combination coefficient group including a combination coefficient with a larger amplitude value is greater than a phase quantization bit quantity used by a combination coefficient group including a smaller amplitude value. For example, it is assumed that Q=2, and the amplitude quantization bit quantity used by the amplitude value of each combination coefficient is 3; the first combination coefficient group is a group including $k_1$ combination coefficients with largest amplitude values, and the second combination coefficient group is a group including $K-k_1$ combination coefficients with smallest amplitude values; a minimum amplitude value, a maximum amplitude value, or sum of amplitude value(s) of the first combination coefficient group is larger, and a used phase quantization bit quantity is 3; and a minimum amplitude value, a maximum amplitude value, or sum of amplitude value(s) of the second combination coefficient group is smaller, and a used phase quantization bit quantity is 2. If the amplitude quantization bit quantity of each of the K combination coefficients is 3, according to this implementation, an amplitude value and a phase value of each of K−1 combination coefficients are reported, and required overheads are $(K-1)*3+(k_1-1)*3+(K-k_1)*2$ bits. Compared with the conventional technology in which a quantization bit quantity used by each of an amplitude value and a phase value of each of all combination coefficients is 3, and required reporting overheads are $(K-1)*6$ bits, the reporting overheads can be reduced, and it can be ensured that a high-precision quantization manner is used for a combination coefficient with a larger amplitude value that has greater impact on a system performance, to minimize a performance loss.

For example, L=6, M=4, K=L*M=24, Q=2, and each combination coefficient group includes 12 combination coefficients. A combination coefficient matrix obtained after linear combination is performed on the six spatial domain beam base vectors and the four frequency-domain base vectors is:

$$\begin{bmatrix} p_{1,1}\varphi_{1,1} & p_{1,2}\varphi_{1,2} & p_{1,3}\varphi_{1,3} & p_{1,4}\varphi_{1,4} \\ p_{2,1}\varphi_{2,1} & p_{2,2}\varphi_{2,2} & p_{2,3}\varphi_{2,3} & p_{2,4}\varphi_{2,4} \\ p_{3,1}\varphi_{3,1} & p_{3,2}\varphi_{3,2} & p_{3,3}\varphi_{3,3} & p_{3,4}\varphi_{3,4} \\ p_{4,1}\varphi_{4,1} & p_{4,2}\varphi_{4,2} & p_{4,3}\varphi_{4,3} & p_{4,4}\varphi_{4,4} \\ p_{5,1}\varphi_{5,1} & p_{5,2}\varphi_{5,2} & p_{5,3}\varphi_{5,3} & p_{5,4}\varphi_{5,4} \\ p_{6,1}\varphi_{6,1} & p_{6,2}\varphi_{6,2} & p_{6,3}\varphi_{6,3} & p_{6,4}\varphi_{6,4} \end{bmatrix}_{6*4} \quad (7)$$

Normalization processing is performed on the combination coefficient matrix with reference to a strongest combination coefficient in the 24 combination coefficients, and it is set in such a manner that an amplitude quantization bit quantity used by an amplitude value of each combination coefficient is 3. In this case, a quantized amplitude set corresponding to the amplitude quantization bit quantity is shown in Table 1.

TABLE 1

| Quantization index | Quantized amplitude value |
|---|---|
| 0 | 0 |
| 1 | $\sqrt{1/64}$ |
| 2 | $\sqrt{1/32}$ |
| 3 | $\sqrt{1/16}$ |
| 4 | $\sqrt{1/8}$ |
| 5 | $\sqrt{1/4}$ |
| 6 | $\sqrt{1/2}$ |
| 7 | 1 |

The combination coefficient matrix may be further expressed as a formula (8), and $\varphi_{i,j}$ in a matrix on the right of the equal sign in the formula (8) is a normalized phase value, where i=1, 2, . . . L and j=1, 2, . . . M:

$$\begin{bmatrix} p_{1,1}\varphi_{1,1} & p_{1,2}\varphi_{1,2} & p_{1,3}\varphi_{1,3} & p_{1,4}\varphi_{1,4} \\ p_{2,1}\varphi_{2,1} & p_{2,2}\varphi_{2,2} & p_{2,3}\varphi_{2,3} & p_{2,4}\varphi_{2,4} \\ p_{3,1}\varphi_{3,1} & p_{3,2}\varphi_{3,2} & p_{3,3}\varphi_{3,3} & p_{3,4}\varphi_{3,4} \\ p_{4,1}\varphi_{4,1} & p_{4,2}\varphi_{4,2} & p_{4,3}\varphi_{4,3} & p_{4,4}\varphi_{4,4} \\ p_{5,1}\varphi_{5,1} & p_{5,2}\varphi_{5,2} & p_{5,3}\varphi_{5,3} & p_{5,4}\varphi_{5,4} \\ p_{6,1}\varphi_{6,1} & p_{6,2}\varphi_{6,2} & p_{6,3}\varphi_{6,3} & p_{6,4}\varphi_{6,4} \end{bmatrix}_{6*4} = \quad (8)$$

$$\begin{bmatrix} \sqrt{1/2}\,\varphi_{1,1} & \sqrt{1/16}\,\varphi_{1,2} & \sqrt{1/32}\,\varphi_{1,3} & \sqrt{1/64}\,\varphi_{1,4} \\ \sqrt{1/64}\,\varphi_{2,1} & \sqrt{1/8}\,\varphi_{2,2} & \sqrt{1/64}\,\varphi_{2,3} & \sqrt{1/16}\,\varphi_{2,4} \\ \sqrt{1/16}\,\varphi_{3,1} & \sqrt{1/64}\,\varphi_{3,2} & \sqrt{1/64}\,\varphi_{3,3} & \sqrt{1/32}\,\varphi_{3,4} \\ 1\varphi_{4,1} & \sqrt{1/32}\,\varphi_{4,2} & \sqrt{1/16}\,\varphi_{4,3} & \sqrt{1/32}\,\varphi_{4,4} \\ \sqrt{1/4}\,\varphi_{5,1} & \sqrt{1/64}\,\varphi_{5,2} & \sqrt{1/8}\,\varphi_{5,3} & \sqrt{1/16}\,\varphi_{5,4} \\ \sqrt{1/16}\,\varphi_{6,1} & \sqrt{1/4}\,\varphi_{6,2} & \sqrt{1/64}\,\varphi_{6,3} & \sqrt{1/64}\,\varphi_{6,4} \end{bmatrix}_{6*4}$$

The 24 combination coefficients are arranged, based on a descending order or ascending order of the amplitude values of the combination coefficients, for example, in descending order, as: $p_{4,1}=1$, $p_{1,1}=\sqrt{1/2}$, $p_{5,1}=\sqrt{1/4}$, $p_{6,2}=\sqrt{1/4}$, $p_{2,2}=\sqrt{1/8}$, $p_{5,3}=\sqrt{1/8}$, $p_{1,2}=\sqrt{1/16}$, $p_{2,4}=\sqrt{1/16}$, $p_{3,1}=\sqrt{1/16}$, $p_{4,3}=\sqrt{1/16}$, $p_{6,1}=\sqrt{1/16}$, $p_{5,4}=\sqrt{1/16}$, $p_{1,3}=\sqrt{1/32}$, $p_{3,4}=\sqrt{1/32}$, $p_{4,2}=\sqrt{1/32}$, $p_{4,4}=\sqrt{1/32}$, $p_{1,4}=\sqrt{1/64}$, $p_{2,1}=\sqrt{1/64}$, $p_{2,3}=\sqrt{1/64}$, $p_{3,2}=\sqrt{1/64}$, $p_{3,3}=\sqrt{1/64}$, $p_{5,2}=\sqrt{1/64}$, $p_{6,3}=\sqrt{1/64}$, and $p_{6,4}=\sqrt{1/64}$. Therefore, the first combination coefficient group includes 12 combination coefficients with largest amplitude values, which are respectively $p_{4,1}\varphi_{4,1}$, $p_{1,1}\varphi_{1,1}$, $p_{5,1}\varphi_{5,1}$, $p_{6,2}\varphi_{6,2}$, $p_{2,2}\varphi_{2,2}$, $p_{5,3}\varphi_{5,3}$, $p_{1,2}\varphi_{1,2}$, $p_{2,4}\varphi_{2,4}$, $p_{3,1}\varphi_{3,1}$, $p_{4,3}\varphi_{4,3}$, $p_{5,4}\varphi_{5,4}$, and $p_{6,1}\varphi_{6,1}$. The second combination coefficient group includes 12 combination coefficients with smallest amplitude values, which are respectively $p_{1,3}\varphi_{1,3}$, $p_{1,4}\varphi_{1,4}$, $p_{2,1}\varphi_{2,1}$, $p_{2,3}\varphi_{2,3}$, $p_{3,2}\varphi_{3,2}$, $p_{3,3}\varphi_{3,3}$, $p_{3,4}\varphi_{3,4}$, $p_{4,2}\varphi_{4,2}$, $p_{4,4}\varphi_{4,4}$, $p_{5,2}\varphi_{5,2}$, $p_{6,3}\varphi_{6,3}$, and $p_{6,4}\varphi_{6,4}$.

In this way, reporting overheads required for reporting the foregoing 23 combination coefficients are 23*3+11*3+12*2 bits, while in the conventional technology, 23*6 bits are required if an amplitude value and a phase value use same quantization precision, which significantly reduces the reporting overheads. In addition, as the value of K increases, more reporting overheads can be reduced in this implementation. In addition, a minimum amplitude value, a maximum amplitude value, or sum of amplitude value(s) of the combination coefficients in the second combination coefficient group is smaller, and the second combination coefficient group has less impact on system performance; and a smaller phase quantization bit quantity, that is, 2, is used for a phase value of each combination coefficient in the combination coefficient group. A minimum amplitude value, a maximum amplitude value, or sum of amplitude value(s) of the combination coefficients in the first combination coefficient group is larger, and the first combination coefficient group has greater impact on system performance; and a larger phase quantization bit quantity, that is, 3, is used for a phase value of each combination coefficient in the combination coefficient group. In this way, a system performance loss can be minimized while reporting overheads are reduced.

1.2 The K combination coefficients are grouped based on l spatial domain beam base vectors corresponding to the K combination coefficients, where l is a positive integer less than or equal to L.

In this implementation, the transmit end may determine, in the K combination coefficients, one or more combination coefficients corresponding to each of the l spatial domain beam base vectors; the transmit end groups the 2L spatial domain beam base vectors based on sum of amplitude value(s), a maximum amplitude value, or a sum of power of the one or more combination coefficients corresponding to each spatial domain beam base vector, to obtain Q spatial domain beam base vector groups; and for one or more spatial domain beam base vectors in each of the Q spatial domain beam base vector groups, the transmit end determines all combination coefficients corresponding to the one or more spatial domain beam base vectors as one combination coefficient group, to obtain the Q combination coefficient groups corresponding to the Q spatial domain beam base vector groups.

In other words, for example, for the combination coefficient matrix shown in the foregoing formula (6), the K combination coefficients may be corresponding combination coefficients distributed in any row, and each row corresponds to one spatial domain beam base vector. Therefore, the l spatial domain beam base vectors include spatial domain beam base vectors corresponding to the row to which the K combination coefficients respectively belong, and correspondingly, one or more combination coefficients corresponding to each spatial domain beam base vector are combination coefficients that are in a row corresponding to the spatial domain beam base vector and that belong to the K combination coefficients.

For example, K=L*M, and the combination coefficient corresponding to an $i^{th}$ spatial domain beam base vector includes $\{p_{i,j}, \varphi_{i,j}, j=1, 2, \ldots, M\}$. Correspondingly, sum of amplitude value(s) of the combination coefficient corresponding to the $i^{th}$ spatial domain beam base vector is $$\sum_{j=1}^{M} |p_{i,j}|,$$

or a maximum amplitude value of the combination coefficient corresponding to the $i^{th}$ spatial domain beam base vector is $\max\{|p_{i,j}|, j=1, 2, \ldots, M\}$, or a sum of power of the combination coefficient corresponding to the $i^{th}$ spatial domain beam base vector is $$\sum_{j=1}^{M} |p_{i,j}|^2.$$

The L spatial domain beam base vectors are grouped based on sum of amplitude value(s), a maximum amplitude value, or a sum of power corresponding to each spatial domain beam base vector, to obtain the Q spatial domain beam base vector groups.

Quantities of spatial domain beam base vectors included in all of the Q spatial domain beam base vector groups may be the same, or may be different.

In an example, that K=L*M is used as an example. Each of the first spatial domain beam base vector group to a $(Q-1)^{th}$ spatial domain beam base vector group may include $\lfloor L/Q \rfloor$ spatial domain beam base vectors, and a $Q^{th}$ spatial domain beam base vector group includes $L-\lfloor L/Q \rfloor(Q-1)$ spatial domain beam base vectors. The first spatial domain beam vector group includes $\lfloor L/Q \rfloor$ spatial domain beam base vectors with larger amplitude value sums, larger maximum amplitude values, or larger sums of power in the L spatial domain beam base vectors, and the $Q^{th}$ spatial domain beam base vector group includes $L-\lfloor L/Q \rfloor(Q-1)$ spatial domain beam base vectors with smaller amplitude value sums, smaller maximum amplitude values, or smaller sums of power in the L spatial domain beam base vectors. If Q is an integer greater than or equal to 3, a $q^{th}$ spatial domain beam base vector includes $\lfloor K/Q \rfloor$ spatial domain beam base vectors with larger amplitude value sums, larger maximum amplitude values, or larger sums of power other than $\lfloor L/Q \rfloor*(q-1)$ combination coefficients with larger amplitude value sums, larger maximum amplitude values, or larger sums of power in the L spatial domain beam base vectors, and q is an integer greater than 1 and less than Q.

In another example, the quantity of spatial domain beam base vectors included in each of the Q spatial domain beam base vector groups may be predefined or notified by using signaling. That is, the $q^{th}$ spatial domain beam base vector group in the Q spatial domain beam base vector groups includes $L_q$ spatial domain beam base vectors, where q is an integer greater than or equal to 1 and less than or equal to Q, and $L_q$ is predefined or notified by using signaling. Quantities $L_q$ of spatial domain beam base vectors included in all the spatial domain beam base vector groups may be the same, or may be different, and $$\sum_{q=1}^{Q} L_q = L.$$

In this way, the first spatial domain beam base vector group includes $L_1$ spatial domain beam base vectors with larger amplitude value sums, larger maximum amplitude values, or larger sums of power in the L spatial domain beam base vectors, and the $Q^{th}$ spatial domain beam base vector group includes $L_Q$ spatial domain beam base vectors with smaller amplitude value sums, smaller maximum amplitude values, or smaller sums of power in the L spatial domain beam base vectors. If Q is an integer greater than or equal to 3, the $q^{th}$ spatial domain beam base vector group includes $L_q$ spatial domain beam base vectors with larger amplitude value sums, larger maximum amplitude values, or larger sums of power other than $$\sum_{q=1}^{q-1} L_q$$

spatial domain beam base vectors with larger amplitude value sums, larger maximum amplitude values, or larger sums of power in the L spatial domain beam base vectors.

Optionally, in the foregoing two examples, "larger" may be replaced with "smaller", that is, grouping is performed in a reverse order, and this is not limited in this embodiment.

Optionally, in this implementation, in the K combination coefficients, all combination coefficients corresponding to each spatial domain beam base vector group are used as one combination coefficient group, and a phase quantization bit quantity used by each combination coefficient group satisfies the following feature: An amplitude value sum, a maximum amplitude value, and a sum of power of a combination coefficient corresponding to each spatial domain beam base vector in a $q_1^{th}$ spatial domain beam base vector group corresponding to a $q_1^{th}$ combination coefficient group are respectively greater than sum of amplitude value(s), a maximum amplitude value, and a sum of power of a combination coefficient corresponding to any spatial domain beam base vector in a $q_2^{th}$ spatial domain beam base vector group corresponding to a $q_2^{th}$ combination coefficient group; a phase quantization bit quantity $B_{q1}$ used by each combination coefficient in the $q_1^{th}$ combination coefficient group is greater than a phase quantization bit quantity $B_{q2}$ used by each combination coefficient in the $q_2^{th}$ combination coefficient group; $q_1$ is not equal to $q_2$; and $q_1$ and $q_2$ are integers greater than or equal to 1 and less than or equal to Q. In this way, larger amplitude value sums, larger maximum amplitude values, or larger sums of power indicate greater impact of these combination coefficient groups on performance Therefore, a larger phase quantization bit quantity is used for these combination coefficient groups, so that a system performance loss can be reduced while reporting overheads are reduced.

For example, in the combination coefficient matrix shown in the foregoing formula (8), using a maximum amplitude value as an example, maximum amplitude values corresponding to the six spatial domain beam base vectors are shown in Table 2:

TABLE 2

| $i^{th}$ spatial domain beam base vector | Corresponding maximum amplitude value |
|---|---|
| 1 | $p_{1,1} = \sqrt{1/2}$ |
| 2 | $p_{2,2} = \sqrt{1/8}$ |
| 3 | $p_{3,4} = \sqrt{1/32}$ |

TABLE 2-continued

| $i^{th}$ spatial domain beam base vector | Corresponding maximum amplitude value |
|---|---|
| 4 | $p_{4,1} = 1$ |
| 5 | $p_{5,1} = \sqrt{1/4}$ |
| 6 | $p_{6,2} = \sqrt{1/4}$ |

Correspondingly, based on that Q=2, the first spatial domain beam base vector group includes three spatial domain beam base vectors with larger maximum amplitude values, and the second spatial domain beam base vector group includes three spatial domain beam base vectors with smaller amplitude values, as shown in Table 3. Correspondingly, combination coefficients corresponding to all the spatial domain beam base vectors in the first spatial domain beam base vector group form the first combination coefficient group, and combination coefficients corresponding to all the spatial domain beam base vectors in the second spatial domain beam base vector group form the second combination coefficient group, as shown in Table 3. When maximum amplitude values corresponding to the fifth spatial domain beam base vector and the sixth spatial domain beam base vector are the same, it is set in such a manner that a larger index of a corresponding spatial domain beam base vector indicates a higher priority of a combination coefficient corresponding to the corresponding spatial domain beam base vector. Therefore, the sixth spatial domain beam base vector in the fifth spatial domain beam base vector and the sixth spatial domain beam base vector that have the same maximum amplitude value may be grouped into a high-precision quantization group, that is, the first spatial domain beam base vector group.

TABLE 3

| $i^{th}$ spatial domain beam base vector | Maximum amplitude value corresponding to the spatial domain beam base vector | $q^{th}$ spatial domain beam base vector group | Combination coefficient corresponding to the spatial domain beam base vector | $q^{th}$ combination coefficient group |
|---|---|---|---|---|
| 4 | $p_{4,1} = 1$ | First spatial domain beam base vector group | $p_{4,1}\varphi_{4,1}, p_{4,2}\varphi_{4,2}, p_{4,3}\varphi_{4,3}, p_{4,4}\varphi_{4,4}$ | First combination coefficient group |
| 1 | $p_{1,1} = \sqrt{1/2}$ | | $p_{1,1}\varphi_{1,1}, p_{1,2}\varphi_{1,2}, p_{1,3}\varphi_{1,3}, p_{1,4}\varphi_{1,4}$ | |
| 6 | $p_{6,2} = \sqrt{1/4}$ | | $p_{6,1}\varphi_{6,1}, p_{6,2}\varphi_{6,2}, p_{6,3}\varphi_{6,3}, p_{6,4}\varphi_{6,4}$ | |
| 5 | $p_{5,1} = \sqrt{1/4}$ | Second spatial domain beam base vector group | $p_{5,1}\varphi_{5,1}, p_{5,2}\varphi_{5,2}, p_{5,3}\varphi_{5,3}, p_{5,4}\varphi_{5,4}$ | Second combination coefficient group |
| 2 | $p_{2,2} = \sqrt{1/8}$ | | $p_{2,1}\varphi_{2,1}, p_{2,2}\varphi_{2,2}, p_{2,3}\varphi_{2,3}, p_{2,4}\varphi_{2,4}$ | |
| 3 | $p_{3,4} = \sqrt{1/32}$ | | $p_{3,1}\varphi_{3,1}, p_{3,2}\varphi_{3,2}, p_{3,3}\varphi_{3,3}, p_{3,4}\varphi_{3,4}$ | |

For example, a phase value of each combination coefficient in the first combination coefficient group may use a phase quantization bit quantity that is 3, and a phase value of each combination coefficient in the second combination coefficient group may use a phase quantization bit quantity that is 2, thereby minimizing a system performance loss while reducing reporting overheads.

In addition, in this embodiment, the amplitude values of the combination coefficients use same amplitude quantization precision. Therefore, a grouping status of the foregoing combination coefficient groups or a grouping status of the spatial domain beam base vectors does not need to be additionally reported; and the receive end can determine the grouping status in the foregoing manner based on the amplitude value of each combination coefficient, thereby avoiding an increase in reporting overheads caused by a grouping indication.

1.3 The K combination coefficients are grouped based on m frequency-domain base vectors corresponding to the K combination coefficients, where m is a positive integer less than or equal to M.

In this implementation, the transmit end may determine, in the K combination coefficients, one or more combination coefficients corresponding to each of the m frequency-domain base vectors; the transmit end groups the m frequency-domain base vectors based on one of sum of amplitude value(s), a maximum amplitude value, or a sum of power of the one or more combination coefficients corresponding to each frequency-domain base vector, to obtain Q frequency-domain base vector groups; and for one or more frequency-domain base vectors in each of the Q frequency-domain base vector groups, the transmit end determines all combination coefficients corresponding to the one or more frequency-domain base vectors as one combination coefficient group, to obtain the Q combination coefficient groups corresponding to the Q frequency-domain base vector groups.

In other words, for example, for the combination coefficient matrix shown in the foregoing formula (6), the K combination coefficients may be combination coefficients distributed in any column, and each column corresponds to one frequency-domain base vector. Therefore, the m frequency-domain base vectors include frequency-domain base vectors corresponding to the column to which the K combination coefficients respectively belong, and correspondingly, one or more combination coefficients corresponding to each frequency-domain base vector are combination coefficients that are in a row corresponding to the frequency-domain base vector and that belong to the K combination coefficients.

For example, K=L*M, and the combination coefficient corresponding to a $j^{th}$ frequency-domain base vector includes $\{p_{i,j}, \varphi_{i,j}, i=1, 2, \ldots, L\}$. Correspondingly, sum of amplitude value(s) of the combination coefficient corresponding to the $j^{th}$ frequency-domain base vector is $$\sum_{i=1}^{L} |p_{i,j}|,$$

or a maximum amplitude value of the combination coefficient corresponding to the $j^{th}$ frequency-domain base vector is $\max\{|p_{i,j}|, i=1, 2, \ldots, L\}$, or a sum of power of the combination coefficient corresponding to the $j^{th}$ frequency-domain base vector is $$\sum_{i=1}^{L} |p_{i,j}|^2.$$

The M frequency-domain base vectors are grouped based on one of sum of amplitude value(s), a maximum amplitude value, or a sum of power corresponding to each spatial domain beam base vector, to obtain the Q frequency-domain base vector groups.

Quantities of frequency-domain base vectors included in all of the Q frequency-domain base vector groups may be the same, or may be different.

In an example, that K=L*M is used as an example. Each of the first frequency-domain base vector group to a $(Q-1)^{th}$ frequency-domain base vector group may include $\lfloor M/Q \rfloor$ frequency-domain base vectors, and a $Q^{th}$ frequency-domain base vector group includes $M-\lfloor M/Q \rfloor(Q-1)$ frequency-domain base vectors. The first frequency-domain base vector group includes $\lfloor M/Q \rfloor$ frequency-domain base vectors with larger amplitude value sums, larger maximum amplitude values, or larger sums of power in the M frequency-domain base vectors, and the $Q^{th}$ frequency-domain base vector group includes $M-\lfloor M/Q \rfloor(Q-1)$ frequency-domain base vectors with smaller amplitude value sums, smaller maximum amplitude values, or smaller sums of power in the M frequency-domain base vectors. If Q is an integer greater than or equal to 3, a $q^{th}$ frequency-domain base vector group includes $\lfloor M/Q \rfloor$ frequency-domain base vectors with larger amplitude value sums, larger maximum amplitude values, or larger sums of power other than $\lfloor M/Q \rfloor*(q-1)$ combination coefficients with larger amplitude value sums, larger maximum amplitude values, or larger sums of power in the M frequency-domain base vectors, and q is an integer greater than 1 and less than Q.

In another example, the quantity of frequency-domain base vectors included in each of the Q frequency-domain base vector groups may be predefined or notified by using signaling. That is, the $q^{th}$ frequency-domain base vector group in the Q frequency-domain base vector groups includes $M_q$ frequency-domain base vectors, where q is an integer greater than or equal to 1 and less than or equal to Q, and $M_q$ is predefined or notified by using signaling. Quantities $M_q$ of frequency-domain base vectors included in all the frequency-domain base vector groups may be the same, or may be different, and $$\sum_{q=1}^{Q} M_q = M.$$

In this way, the first frequency-domain base vector group includes $M_1$ frequency-domain base vectors with larger amplitude value sums, larger maximum amplitude values, or larger sums of power in the M frequency-domain base vectors, and the $Q^{th}$ frequency-domain base vector group includes $M_Q$ frequency-domain base vectors with smaller amplitude value sums, smaller maximum amplitude values, or smaller sums of power in the M frequency-domain base vectors. If Q is an integer greater than or equal to 3, the $q^{th}$ frequency-domain base vector group includes $M_q$ frequency-domain base vectors with larger amplitude value sums, larger maximum amplitude values, or larger sums of power other than $$\sum_{q=1}^{q-1} M_q$$

frequency-domain base vectors with larger amplitude value sums, larger maximum amplitude values, or larger sums of power in the M frequency-domain base vectors.

Optionally, in the foregoing two examples, "larger" may be replaced with "smaller", that is, grouping is performed in ascending order of amplitude value sums, maximum amplitude values, or sum of powers, and this is not limited in this embodiment.

Optionally, in this implementation, in the Q combination coefficient groups, sum of amplitude value(s), a maximum amplitude value, and a sum of power of a combination coefficient corresponding to each frequency-domain base vector in a $q_1^{th}$ frequency-domain base vector group corresponding to a $q_1^{th}$ combination coefficient group are respectively greater than sum of amplitude value(s), a maximum amplitude value, and a sum of power of a combination coefficient corresponding to any frequency-domain base vector in a $q_2^{th}$ frequency-domain base vector group corresponding to a $q_2^{th}$ combination coefficient group; a phase quantization bit quantity $B_{q1}$ used by each combination coefficient in the $q_1^{th}$ combination coefficient group is greater than a phase quantization bit quantity $B_{q2}$ used by each combination coefficient in the $q_2^{th}$ combination coefficient group; $q_1$ is not equal to $q_2$; and $q_1$ and $q_2$ are integers greater than or equal to 1 and less than or equal to Q. In this way, larger amplitude value sums, larger maximum amplitude values, or larger sums of power indicate greater impact of these combination coefficient groups on performance. Therefore, a larger phase quantization bit quantity is used for these combination coefficient groups, so that a system performance loss can be reduced while reporting overheads are reduced.

For example, in the combination coefficient matrix shown in the foregoing formula (8), using sum of amplitude value(s) of a combination coefficient corresponding to a frequency-domain base vector as an example, amplitude value sums corresponding to the four frequency-domain base vectors are shown in Table 4:

TABLE 4

| $j^{th}$ frequency-domain base vector | Corresponding amplitude value sum |
|---|---|
| 1 | $1 + \sqrt{1/2} + \sqrt{1/4} + 2\sqrt{1/16} + \sqrt{1/64}$ |
| 2 | $\sqrt{1/4} + \sqrt{1/8} + \sqrt{1/16} + \sqrt{1/32} + 2\sqrt{1/64}$ |
| 3 | $\sqrt{1/8} + \sqrt{1/16} + \sqrt{1/32} + 3\sqrt{1/64}$ |
| 4 | $2\sqrt{1/16} + 2\sqrt{1/32} + 2\sqrt{1/64}$ |

Correspondingly, based on that Q=2, the first frequency-domain base vector group includes two frequency-domain base vectors with larger amplitude value sums, and the second frequency-domain base vector group includes two frequency-domain base vectors with smaller amplitude value sums, as shown in Table 3. Correspondingly, combination coefficients corresponding to all the frequency-domain base vectors in the first frequency-domain base vector group form the first combination coefficient group, and combination coefficients corresponding to all the frequency-domain base vectors in the second frequency-domain base vector group form the second combination coefficient group, as shown in Table 5.

TABLE 5

| $i^{th}$ frequency-domain base vector | Amplitude value sum corresponding to the frequency-domain base vector | $q^{th}$ frequency-domain base vector group | Combination coefficient corresponding to the frequency-domain base vector | $q^{th}$ combination coefficient group |
|---|---|---|---|---|
| 1 | $1 + \sqrt{1/2} + \sqrt{1/4} + 2\sqrt{1/16} + \sqrt{1/64}$ | First frequency-domain base vector group | $p_{1,1}\varphi_{1,1}, p_{2,1}\varphi_{2,1}, p_{3,1}\varphi_{3,1}, p_{4,1}\varphi_{4,1}$ $p_{5,1}\varphi_{5,1}, p_{6,1}\varphi_{6,1}$, | First combination coefficient group |
| 2 | $\sqrt{1/4} + \sqrt{1/8} + \sqrt{1/16} + \sqrt{1/32} + 2\sqrt{1/64}$ | | $p_{1,2}\varphi_{1,2}, p_{2,2}\varphi_{2,2}, p_{3,2}\varphi_{3,2}, p_{4,2}\varphi_{4,2}, p_{5,2}\varphi_{5,2}, p_{6,2}\varphi_{6,2}$, | |
| 3 | $\sqrt{1/8} + \sqrt{1/16} + \sqrt{1/32} + 3\sqrt{1/64}$ | Second frequency-domain base vector group | $p_{1,3}\varphi_{1,3}, p_{2,3}\varphi_{2,3}, p_{3,3}\varphi_{3,3}, p_{4,3}\varphi_{4,3}, p_{5,3}\varphi_{5,3}, p_{6,3}\varphi_{6,3}$, | Second combination coefficient group |
| 4 | $2\sqrt{1/16} + 2\sqrt{1/32} + 2\sqrt{1/64}$ | | $p_{1,4}\varphi_{1,4}, p_{2,4}\varphi_{2,4}, p_{3,4}\varphi_{3,4}, p_{5,4}\varphi_{5,4}, p_{6,4}\varphi_{6,4}$ | |

For example, a phase value of each combination coefficient in the first combination coefficient group may use a phase quantization bit quantity that is 3, and a phase value of each combination coefficient in the second combination coefficient group may use a phase quantization bit quantity that is 2, thereby minimizing a system performance loss while reducing reporting overheads.

In addition, in this embodiment, the amplitude values of the combination coefficients use same amplitude quantization precision. Therefore, a grouping status of the foregoing combination coefficient groups or a grouping status of the frequency-domain base vectors does not need to be additionally reported; and the receive end can determine the grouping status in the foregoing manner based on the amplitude value of each combination coefficient, thereby avoiding an increase in reporting overheads caused by grouping.

1.4 A combination coefficient corresponding to each spatial domain beam base vector is grouped based on l spatial domain beam base vectors corresponding to the K combination coefficients, to obtain the Q combination coefficient groups corresponding to the K combination coefficients, where l is a positive integer less than or equal to 2L.

In this implementation, the transmit end may determine, in the K combination coefficients, one or more combination coefficients corresponding to each of the l spatial domain beam base vectors; for the one or more combination coefficients corresponding to each spatial domain beam base vector, the transmit end groups the one or more combination coefficients based on a descending order or ascending order of an amplitude value of each combination coefficient, to obtain the Q combination coefficient groups corresponding to each spatial domain beam base vector; and the transmit end combines a $q^{th}$ combination coefficient group corresponding to each of the l spatial domain beam base vectors, to obtain a $q^{th}$ combination coefficient group in the Q combination coefficient groups of the K combination coefficients, where q is an integer equal to 1, 2, . . . , or Q.

In other words, for example, for the combination coefficient matrix shown in the foregoing formula (6), the K combination coefficients may be combination coefficients distributed in any row, and each row corresponds to one spatial domain beam base vector. Therefore, the l spatial domain beam base vectors include spatial domain beam base vectors corresponding to the row to which the K combination coefficients respectively belong, and correspondingly, one or more combination coefficients corresponding to each spatial domain beam base vector are combination coefficients that are in a row corresponding to the spatial domain beam base vector and that belong to the K combination coefficients.

Optionally, in this implementation, in the l spatial domain beam base vectors corresponding to the K combination coefficients, quantities of combination coefficients included in all of the Q combination coefficient groups corresponding to each spatial domain beam base vector may be the same, or may be different.

For example, an $l_1^{th}$ spatial domain beam base vector corresponds to $K_{l_1}$ combination coefficients; the first combination coefficient group to a $(Q-1)^{th}$ combination coefficient group corresponding to the $l_1^{th}$ spatial domain beam base vector each may include $\lfloor K/Q \rfloor$ combination coefficients; and a $Q^{th}$ combination coefficient group corresponding to the $l_1^{th}$ spatial domain beam base vector may include $K_{l_1} - \lfloor K_{l_1}/Q \rfloor (Q-1)$ combination coefficients, where $l_1 = 1, 2, \ldots,$ or L.

For another example, if an $l_1^{th}$ spatial domain beam base vector corresponds to $K_{l_1}$ combination coefficients, an $l_{1q}^{th}$ combination coefficient group corresponding to the $l_1^{th}$ spatial domain beam base vector may include $K_{l_1q}$ combination coefficients, where $l_1 = 1, 2, \ldots,$ or L, and $q = 1, 2, \ldots,$ or Q. $K_{l_1q}$ may be predefined by a system or notified by a base station. In this way, the first combination coefficient group corresponding to the $l_1^{th}$ spatial domain beam base vector includes $K_{l_1 1}$ combination coefficients with larger amplitude values in combination coefficients corresponding to the $l_1^{th}$ spatial domain beam base vector. A $Q^{th}$ combination coefficient group corresponding to the $l_1^{th}$ spatial domain beam base vector includes $K_{l_1 Q}$ combination coefficients with smaller amplitude values in the combination coefficients corresponding to the $l_1^{th}$ spatial domain beam base vector. If Q is an integer greater than or equal to 3, a $q^{th}$ combination coefficient group corresponding to the $l_1^{th}$ spatial domain beam base vector includes $K_{l_1q}$ combination coefficients with larger amplitude values other than $$\sum_{q=1}^{q-1} K_{l_1q}$$

combination coefficients with larger amplitude values in the combination coefficients corresponding to the $l_1^{th}$ spatial domain beam base vector.

Optionally, in this implementation, in the Q combination coefficient groups corresponding to each spatial domain beam base vector, a minimum amplitude value, a maximum amplitude value, or sum of amplitude value(s) of a $q_1^{th}$ combination coefficient group is greater than a minimum amplitude value, a maximum amplitude value, or sum of amplitude value(s) of a $q_2^{th}$ combination coefficient group; in the Q combination coefficient groups of the K combination coefficients, a phase quantization bit quantity $B_{q_1}$ used by the $q_1^{th}$ combination coefficient group is greater than a phase quantization bit quantity $B_{q_2}$ used by the $q_2^{th}$ combination coefficient group; $q_1$ is not equal to $q_2$; and $q_1$ and $q_2$ are integers greater than or equal to 1 and less than or equal to Q. In this way, larger amplitude value sums, larger maximum amplitude values, or larger sums of power indicate greater impact of these combination coefficient groups on performance Therefore, a larger phase quantization bit quantity is used for these combination coefficient groups, so that a system performance loss can be reduced while reporting overheads are reduced.

For example, in the combination coefficient matrix shown in the foregoing formula (8), two combination coefficient groups corresponding to the four frequency-domain base vectors are combined, to obtain two combination coefficient groups corresponding to 24 combination coefficients. As shown in Table 6, the combination coefficients corresponding to each spatial domain beam base vector are grouped into two combination coefficient groups based on the amplitude values; and further, the first combination coefficient group corresponding to each spatial domain beam base vector is combined, to obtain the first combination coefficient group corresponding to the 24 combination coefficients, and the second combination coefficient group corresponding to each spatial domain beam base vector is combined, to obtain the second combination coefficient group corresponding to the 24 combination coefficients.

TABLE 6

| $i^{th}$ spatial domain beam base vector | First combination coefficient group corresponding to each spatial domain beam base vector | Second combination coefficient group corresponding to each spatial domain beam base vector |
| --- | --- | --- |
| 1 | $p_{1,1}\varphi_{1,1}, p_{1,2}\varphi_{1,2}$ | $p_{1,3}\varphi_{1,3}, p_{1,4}\varphi_{1,4}$ |
| 2 | $p_{2,1}\varphi_{2,1}, p_{2,3}\varphi_{2,3}$ | $p_{2,2}\varphi_{2,2}, p_{2,4}\varphi_{2,4}$ |
| 3 | $p_{3,2}\varphi_{3,2}, p_{3,3}\varphi_{3,3}$ | $p_{3,1}\varphi_{3,1}, p_{3,4}\varphi_{3,4}$ |
| 4 | $p_{4,2}\varphi_{4,2}, p_{4,4}\varphi_{4,4}$ | $p_{4,1}\varphi_{4,1}, p_{4,3}\varphi_{4,3}$ |
| 5 | $p_{5,2}\varphi_{5,2}, p_{5,4}\varphi_{5,4}$ | $p_{5,1}\varphi_{5,1}, p_{5,3}\varphi_{5,3}$ |
| 6 | $p_{6,3}\varphi_{6,3}, p_{6,4}\varphi_{6,4}$ | $p_{6,1}\varphi_{6,1}, p_{6,2}\varphi_{6,2}$ |
| | First combination coefficient group corresponding to the 24 combination coefficients | Second combination coefficient group corresponding to the 24 combination coefficients |
| | $p_{1,1}\varphi_{1,1}, p_{1,2}\varphi_{1,2}$ $p_{2,1}\varphi_{2,1}, p_{2,3}\varphi_{2,3}$ $p_{3,2}\varphi_{3,2}, p_{3,3}\varphi_{3,3}$ $p_{4,2}\varphi_{4,2}, p_{4,4}\varphi_{4,4}$ $p_{5,2}\varphi_{5,2}, p_{5,4}\varphi_{5,4}$ $p_{6,3}\varphi_{6,3}, p_{6,4}\varphi_{6,4}$ | $p_{1,3}\varphi_{1,3}, p_{1,4}\varphi_{1,4}$ $p_{2,2}\varphi_{2,2}, p_{2,4}\varphi_{2,4}$ $p_{3,1}\varphi_{3,1}, p_{3,4}\varphi_{3,4}$ $p_{4,1}\varphi_{4,1}, p_{4,3}\varphi_{4,3}$ $p_{5,1}\varphi_{5,1}, p_{5,3}\varphi_{5,3}$ $p_{6,1}\varphi_{6,1}, p_{6,2}\varphi_{6,2}$ |

For example, a phase value of each combination coefficient in the finally determined first combination coefficient group may use a phase quantization bit quantity that is 3, and a phase value of each combination coefficient in the finally determined second combination coefficient group may use a phase quantization bit quantity that is 2, thereby minimizing a system performance loss while reducing reporting overheads.

A same grouping rule is used when the combination coefficients corresponding to all the spatial domain beam base vectors are grouped.

In addition, in this embodiment, the amplitude values of the combination coefficients use same amplitude quantization precision. Therefore, a grouping status of the foregoing combination coefficient groups or a grouping status of the combination coefficients corresponding to all the spatial domain beam base vectors does not need to be additionally reported; and the receive end can determine the grouping status in the foregoing manner based on the amplitude value of each combination coefficient, thereby avoiding an increase in reporting overheads caused by a grouping indication.

The optional implementation may be predefined by the transmit end and the receive end, or notified by the base station to the terminal device, so that the transmit end and the receive end use a same grouping rule. This helps the receive end obtain the grouping status of all the combination coefficients based on the amplitude values of all the combination coefficients, thereby avoiding reporting overheads caused by an additional indication of the grouping status.

Optionally, phase quantization bit quantities and/or phase quantization rules used by at least one of the foregoing combination coefficient groups and another combination coefficient group are different. For example, a minimum amplitude value, sum of amplitude value(s), a maximum amplitude value, or a sum of power corresponding to the determined first combination coefficient group is greater than a minimum amplitude value, sum of amplitude value (s), a maximum amplitude value, or a sum of power corresponding to the second combination coefficient group. Therefore, a phase value of the first combination coefficient group uses a phase quantization bit quantity $B_1=3$, and correspondingly, a quantized phase set formed by optional quantized phase values is:

$\{\exp(j2\pi c_{1l_2m_2}), c_{1l_2m_2}=0,1,2,3\}$. $c_{1l_2m_2}$ represents an index corresponding to a quantized phase value of a combination coefficient in the first combination coefficient group; $l_2$ represents an index of a spatial domain beam base vector corresponding to the combination coefficient, and is an integer in a value range of $[1, L]$; and $m_2$ represents an index of a frequency-domain base vector corresponding to the combination coefficient, and is an integer in a value range of $[1, M]$. That is, for each combination coefficient in the first combination coefficient group, a quantized phase value closest to an actual phase value of the combination coefficient may be selected from the quantized phase set, as a phase value of the combination coefficient. Therefore, in the precoding matrix indication information, 3 bits may be used to represent an index of the phase value of the combination coefficient in the quantized phase set, as the phase value of the combination coefficient. Similarly, a phase value of the second combination coefficient group uses a phase quantization bit quantity $B_2=2$, and correspondingly, a quantized phase set formed by optional quantized phase values is: $\{\exp(j2\pi c_{2l_2m_2}), c_{2l_2m_2}=0, 1, 2, 3\}$. $c_{2l_2m_2}$ represents an index corresponding to a quantized phase value of a combination coefficient in the second combination coefficient group. For each combination coefficient in the second combination coefficient group, a quantized phase value closest to an actual phase value of the combination coefficient may be selected from the quantized phase set, as a phase value of the combination coefficient. Therefore, in the precoding matrix indication information, 2 bits may be used to represent an index of the phase value of the combination coefficient in the quantized phase set, as the phase value of the combination coefficient.

In an optional implementation, the amplitude value of each of the K combination coefficients is determined by performing quantization by using a quantization bit quantity $A_1$, and $A_1$ is an integer greater than or equal to 2. For example, the amplitude quantization bit quantity is 3, and a quantized amplitude set formed by optional quantized amplitude values is shown in Table 1. For each combination coefficient, a quantized amplitude value may be selected from Table 1, and the quantized amplitude value is closest to an actual value obtained after normalization processing is performed on the combination coefficient. Correspondingly, the precoding indication information may carry a quantization index indicated by 3 bits, to indicate a quantized amplitude value of the combination coefficient, and the quantized amplitude value may be used as the amplitude value of the combination coefficient, so that the receive end can obtain, based on the quantized amplitude set, the quantized amplitude value corresponding to the quantization index indicated by the 3 bits.

In another optional implementation, for the amplitude value of the combination coefficient corresponding to each spatial domain beam base vector, an amplitude quantization rule for differential amplitude quantization is used with reference to an average amplitude value of the combination coefficient corresponding to the spatial domain beam base vector. In other words, the K combination coefficients correspond to l spatial domain beam base vectors, and each of the l spatial domain beam base vectors corresponds to one or more combination coefficients. The transmit end may calculate an average amplitude value of the combination coefficient corresponding to the spatial domain beam base vector, as an average amplitude value of each spatial domain beam base vector, and perform quantization by using an amplitude quantization bit quantity $A_2$ for the average amplitude value of each spatial domain beam base vector. In addition, the transmit end may perform differential amplitude quantization by using an amplitude quantization bit quantity $A_3$ with reference to the average amplitude value for the amplitude value of each combination coefficient corresponding to each spatial domain beam base vector. Therefore, an amplitude value of one combination coefficient corresponding to each spatial domain beam base vector is a product of the average amplitude value and a differential amplitude value of the combination coefficient. $A_2$ is an integer greater than or equal to 2, and $A_3$ is an integer greater than or equal to 1.

For example, if $A_2$ is 3 and $A_3$ is 2, optional average amplitude values in an average quantized amplitude set are also the eight values shown in Table 1, and a differential quantized amplitude set is shown in Table 7. For each spatial domain beam base vector, the transmit end may select an average quantized amplitude value from the average quantized amplitude set shown in Table 1, where the average quantized amplitude value is a quantized value closest to an average amplitude value of the combination coefficient corresponding to the spatial domain beam base vector. Further, for each combination coefficient corresponding to each spatial domain beam base vector, the transmit end selects a differential quantized amplitude value from the differential quantized amplitude set shown in Table 7, where the differential quantized amplitude value is a quantized value closest to a differential amplitude value between the amplitude value of the combination coefficient and the average amplitude value. Therefore, the precoding indication information may carry average amplitude values (which may also be referred to as indexes of the average amplitude values in the quantized amplitude set shown in Table 1) corresponding to all of the l spatial domain beam base vectors, and amplitude values (which may also be referred to as differential quantized amplitude values, or quantization indexes of the differential quantized amplitude values in the differential quantized amplitude set shown in Table 7) of the combination coefficients corresponding to all the spatial domain beam base vectors. Correspondingly, the receive end receives the precoding indication information, and may also obtain, by using Table 1 and Table 7, the average amplitude value corresponding to each spatial domain beam base vector and the differential quantized amplitude value corresponding to each combination coefficient, to obtain the quantized amplitude value (which may also be referred to as an amplitude value) of each combination coefficient.

TABLE 7

| Quantization index | Differential quantized amplitude value |
| --- | --- |
| 0 | 0 |
| 1 | $\sqrt{1/2}$ |
| 2 | 1 |
| 3 | $\sqrt{2}$ |

In another optional implementation, for the amplitude value of the combination coefficient corresponding to each spatial domain beam base vector, an amplitude quantization rule for differential amplitude quantization is used with reference to a maximum amplitude value of the combination coefficient corresponding to the spatial domain beam base vector. Table 8 shows a differential quantized amplitude set formed by optional differential quantized amplitude values with reference to a maximum amplitude value. For each spatial domain beam base vector, the transmit end may select a quantized amplitude value from Table 1, where the quantized amplitude value is a quantized value closest to the maximum amplitude value of the combination coefficient corresponding to the spatial domain beam base vector. Further, for each combination coefficient corresponding to each spatial domain beam base vector, the transmit end selects a differential quantized amplitude value from the differential quantized amplitude set shown in Table 8, where the differential quantized amplitude value is a quantized value closest to a differential amplitude value between the amplitude value of the combination coefficient and the maximum amplitude value. Therefore, the precoding indication information may carry maximum amplitude values (which may also be referred to as indexes of the corresponding maximum amplitude values in the quantized amplitude set shown in Table 1) corresponding to all of the l spatial domain beam base vectors, and amplitude values (which may also be referred to as differential quantized amplitude values, or quantization indexes of the differential quantized amplitude values in the differential quantized amplitude set shown in Table 8) of the combination coefficients corresponding to all the spatial domain beam base vectors. Correspondingly, the receive end receives the precoding matrix indication information, and may also obtain, by using Table 1 and Table 8, the maximum amplitude value corresponding to each spatial domain beam base vector and the differential quantized amplitude value corresponding to each combination coefficient, to obtain the quantized amplitude value (namely, an amplitude value) of each combination coefficient.

TABLE 8

| Quantization index | Maximum quantized amplitude value |
| --- | --- |
| 0 | 0 |
| 1 | $\sqrt{1/4}$ |
| 2 | $\sqrt{1/2}$ |
| 3 | 1 |

In this embodiment, the transmit end and the receive end may know, through notification by the base station or through predefinition, that in the precoding matrix indication information, the amplitude values of all of the K combination coefficients are located before or after the phase values of all the combination coefficients. That is, the amplitude values of all of the K combination coefficients are located in high-order bits, and the phase values of all of the K combination coefficients are located in low-order bits; or the amplitude values of all of the K combination coefficients are located in low-order bits, and the phase values of all of the K combination coefficients are located in high-order bits.

Optionally, in the precoding matrix indication information, the amplitude values of all of the K combination coefficients are sequentially arranged based on a descending order or ascending order of indexes of the spatial domain beam base vectors corresponding to the combination coefficients. For example, K=L*M, an amplitude value of a combination coefficient corresponding to an $(i-1)^{th}$ spatial domain beam base vector is arranged before the amplitude value of the combination coefficient corresponding to the $i^{th}$ spatial domain beam base vector, where i=2, . . . , or L. Further, the amplitude value of the combination coefficient corresponding to each spatial domain beam base vector may be arranged based on the index of the frequency-domain base vector corresponding to each combination coefficient, for example, the amplitude value of the combination coefficient corresponding to the $i^{th}$ spatial domain beam base vector is further arranged based on the index of the frequency-domain base vector corresponding to each combination coefficient, for example, in the $i^{th}$ spatial domain beam base vector, an amplitude value of $p_{i(j-1)}\varphi_{i(j-1)}$ is arranged before an amplitude value of $p_{ij}\varphi_{ij}$, where j=2, . . . , or M.

In the precoding matrix indication information, the phase values of all of the K combination coefficients are sequentially arranged based on a descending order or ascending order of indexes of the spatial domain beam base vectors corresponding to the combination coefficients or indexes of the frequency-domain base vectors corresponding to the combination coefficients; or in the precoding matrix indication information, for the Q combination coefficient groups to which the K combination coefficients respectively belong, phase values of the combination coefficient groups are sequentially arranged based on a descending order or ascending order of indexes of the combination coefficient groups. For example, phase values of all combination coefficients in the first combination coefficient group are arranged before or after phase values of all combination coefficients in the second combination coefficient group. In the phase value of each combination coefficient group, phase values of combination coefficients are sequentially arranged based on a descending order or ascending order of indexes of spatial domain beam base vectors corresponding to the combination coefficients or indexes of frequency-domain base vectors corresponding to the combination coefficients.

Optionally, the precoding matrix indication information further includes an average amplitude value or a maximum amplitude value corresponding to each of l spatial domain beam base vectors; and the average amplitude values or the maximum amplitude values corresponding to the spatial domain beam base vectors are arranged based on a descending order or ascending order of indexes of the spatial domain beam base vectors.

In this embodiment, in a process of arranging the amplitude values or the phase values, in a process of performing arrangement based on a sequence of the indexes of the spatial domain beam base vectors corresponding to the combination coefficients, if indexes of spatial domain beam base vectors corresponding to a plurality of combination coefficients are the same, arrangement may be further performed based on a descending order or ascending order of indexes of frequency-domain base vectors corresponding to the plurality of combination coefficients. Correspondingly, in a process of arranging the amplitude values or the phase values, in a process of performing arrangement based on a sequence of the indexes of the frequency-domain base vectors corresponding to the combination coefficients, if indexes of frequency-domain base vectors corresponding to a plurality of combination coefficients are the same, arrangement may be further performed based on a descending order or ascending order of indexes of spatial domain beam base vectors corresponding to the plurality of combination coefficients. For example, as shown in the formula (8), the amplitude values or the phase values of the L*M combination coefficients may be arranged one by one based on each row shown in the formula (8), or may be arranged one by one based on each column shown in the formula (8).

In an optional implementation, in a process of arranging the phase values, arrangement may be performed first based on a sequence of the indexes of the combination coefficient groups. For combination coefficients having a same index in the combination coefficient groups, phase values may be arranged based on a descending order or ascending order of indexes of corresponding spatial domain beam base vectors. Further, if the indexes of the spatial domain beam base vectors corresponding to the combination coefficients are also the same, arrangement may be performed based on a descending order or ascending order of indexes of corresponding frequency-domain base vectors. For example, in the combination coefficient groups corresponding to the formula (8), as shown in Table 6, phase values of the combination coefficients in the first combination coefficient group corresponding to the 24 combination coefficients are first arranged; and then phase values of the combination coefficients in the second combination coefficient group corresponding to the 24 combination coefficients are arranged. For the combination coefficients in the first combination coefficient group, arrangement may be performed based on a descending order or ascending order of indexes of spatial domain beam base vectors corresponding to the combination coefficients. For example, $p_{1,1}\varphi_{1,1}$ and $p_{1,2}\varphi_{1,2}$ corresponding to the first spatial domain beam base vector are first arranged; . . . ; and $p_{6,3}\varphi_{6,3}$ and $p_{6,4}\varphi_{6,4}$ corresponding to the sixth spatial domain beam base vector are last arranged. For combination coefficients with a same index of corresponding spatial domain beam base vectors, for example, $p_{1,1}\varphi_{1,1}$ and $p_{1,2}\varphi_{1,2}$, arrangement may be performed based on a descending order or ascending order of indexes of corresponding frequency-domain base vectors, for example, $p_{1,1}\varphi_{1,1}$ corresponding to the first frequency-domain base vector is first arranged, and then $p_{1,2}\varphi_{1,2}$ corresponding to the second frequency-domain base vector is arranged.

In addition, assuming that K is equal to L*M, that is, after normalization processing is performed on the combination coefficients in the foregoing combination coefficient matrix $\tilde{W}$ by using a strongest combination coefficient, overheads required for reporting amplitude values and phase values of L*M−1 combination coefficients other than the strongest combination coefficient are compared and analyzed. That is, as shown in Table 8, overheads required in the solution in this embodiment are compared and analyzed with overheads required in other solutions.

Solution 1: For the L*M−1 combination coefficients, amplitude quantization and phase quantization with equal precision are separately performed by using 3 bits. In this case, overheads required for reporting the amplitude value and the phase value of each of the L*M−1 combination coefficients in the reported precoding indication information are (L*M−1)*6.

Solution 2: For the L*M−1 combination coefficients, the average amplitude value corresponding to each spatial domain beam base vector is quantized by using 3 bits. Differential quantization is performed, by using 2 bits with reference to the average amplitude value, on the amplitude value of each combination coefficient corresponding to each spatial domain beam base vector. In this case, overheads required by the average amplitude values of all the spatial domain beam base vectors in the reported precoding indication information are L*3, and overheads required by differential quantized amplitude values of the L*M−1 combination coefficients are (L*M−1)*2. Each of the phase values of the L*M−1 combination coefficients is quantized by using 3 bits. In this case, overheads required by the phase values of the L*M−1 combination coefficients are (L*M−1)*3. Therefore, in the solution 2, overheads required for reporting the amplitude value and the phase value of each of the L*M−1 combination coefficients are L*3+(L*M−1)*5.

Solution 3: For the L*M−1 combination coefficients, the combination coefficients of all of the L spatial domain beam base vectors are grouped into two combination coefficient groups. A combination coefficient group with a larger amplitude uses an amplitude quantization bit quantity that is 3 and a phase quantization bit quantity that is 3, and a combination coefficient group with a smaller amplitude uses an amplitude quantization bit quantity that is 2 and a phase quantization bit quantity that is 2. In this way, overheads required by the amplitude value and the phase value of each of the L*M−1 combination coefficients are (L*M/2−1)*6+L*M/2*4. In addition, a grouping status of the combination coefficient corresponding to each spatial domain beam base vector needs to be additionally indicated, and required overheads are $L*\log_2(C_M^{M/2})$. Therefore, in the solution 3, overheads required for reporting the amplitude value and the phase value of each of the 2L*M−1 combination coefficients are $(L*M/2-1)*6+L*M/2*4+L*\log_2(C_M^{M/2})$.

In the solution in this embodiment, for the L*M−1 combination coefficients, the amplitude values of all the combination coefficients are quantized with equal precision by using the amplitude quantization bit quantity that is 3. The grouping method in the foregoing implementation 1.4 is used, and that Q=2 is used as an example. The phase value of the first combination coefficient group uses the phase quantization bit quantity that is 3, and the second combination coefficient group uses the phase quantization bit quantity that is 2. In addition, in the grouping method, grouping is performed based on the amplitude value, and the amplitude value uses a same quantization method. Therefore, in this embodiment, the grouping status does not need to be additionally indicated, and the receive end may obtain the grouping status based on the amplitude values of all the combination coefficients according to the grouping method in 1.4. Therefore, in this solution, overheads required for reporting the amplitude value and the phase value of each of the L*M−1 combination coefficients are (L*M−1)*3+(L*M/2−1)*3+L*M/2*2.

For example, as shown in Table 9, when L=4, and M=3; L=4, and M=4; or L=4, and M=5, the solution in this embodiment has lower quantization overheads than the other solutions.

TABLE 9

| | Overheads | L = 8, and M = 3 | L = 8, and M = 4 | L = 8, and M = 5 |
|---|---|---|---|---|
| Solution 1 | (L*M − 1)*6 | 138 | 186 | 234 |
| Solution 2 | 2L*3 + (L*M − 1)*5 | 139 | 179 | 219 |
| Solution 3 | (L*M/2 − 1)*6 + L*M/2*4 + L*log$_2$(C$_M^{M/2}$) | 154 | 210 | 258 |
| Embodiment solution | (L*M − 1)*3 + (L*M/2 − 1)*3 + L*M/2*2 | 126 | 170 | 214 |

In this embodiment, the optional implementations of how to group the K combination coefficients, a relationship between the phase quantization bit quantity used by each combination coefficient group and the amplitude value of the combination coefficient in the combination coefficient group, the amplitude quantization method, the phase quantization method, and the like are described above. The foregoing descriptions are merely used to describe this embodiment, but are not intended to limit this embodiment. Optionally, in the foregoing grouping method, grouping may alternatively be performed by using another predefined rule. In addition, in the foregoing phase quantization method, quantization may alternatively be performed by using another predefined rule. However, basic ideas remain unchanged. For example, all the amplitude values use a same amplitude quantization method, grouping is performed based on the amplitude value of each combination coefficient, and phase quantization used for each combination coefficient group may be different. Therefore, it can be ensured that reporting overheads are reduced while a system performance loss is minimized, and codebook compression efficiency is improved.

In addition, mentioning an "embodiment" means that a particular characteristic, structure, or feature described with reference to this embodiment may be included in at least one embodiment. The phrase shown in various locations in the embodiments may not necessarily refer to a same embodiment, and is not an independent or optional embodiment exclusive from another embodiment. It is explicitly and implicitly understood by a person of ordinary skill in the art that the embodiments described may be combined with another embodiment.

Figure 3:
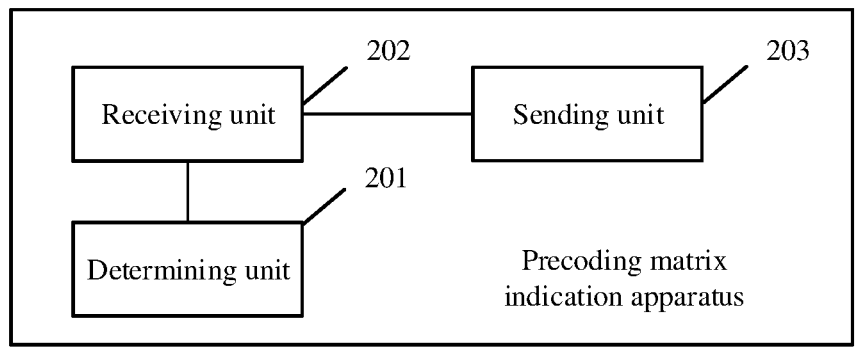
FIG. 3 is a schematic structural diagram of a precoding matrix indication apparatus according to an embodiment.

FIG. 3 is a schematic structural diagram of a precoding matrix indication apparatus according to an embodiment. The precoding matrix indication apparatus may be located in a transmit end. The precoding matrix indication apparatus includes a determining unit 201, a grouping unit 202, and a sending unit 203. The determining unit 201 and the grouping unit 202 may be a processing unit.

The determining unit 201 is configured to determine an amplitude value of each of K combination coefficients corresponding to each spatial layer, where the amplitude value of each combination coefficient is determined by using a same amplitude quantization bit quantity and a same amplitude quantization rule; K is a positive integer less than or equal to L*M; L is a total quantity of spatial domain beam base vectors that is determined by the transmit end; and M is a total quantity of frequency-domain base vectors that is determined by the transmit end.

The grouping unit 202 is configured to group the K combination coefficients based on the amplitude value of each of the K combination coefficients, to obtain Q combination coefficient groups, where Q is an integer greater than or equal to 2.

The determining unit 201 is further configured to determine a phase value of each combination coefficient in each combination coefficient group, where phase quantization bit quantities and/or phase quantization rules used by at least two of the Q combination coefficient groups are different.

The sending unit 203 is configured to send precoding matrix indication information, where the precoding matrix indication information includes the amplitude value and the phase value of each of the K combination coefficients.

In an optional implementation, that the grouping unit 202 groups the K combination coefficients based on the amplitude value of each of the K combination coefficients, to obtain the Q combination coefficient groups is: grouping the K combination coefficients based on a descending order or ascending order of the amplitude values of all of the K combination coefficients, to obtain the Q combination coefficient groups.

Optionally, in the Q combination coefficient groups, a minimum amplitude value, a maximum amplitude value, or sum of amplitude value(s) of combination coefficients in a $q_1^{th}$ combination coefficient group is greater than a minimum amplitude value, a maximum amplitude value, or sum of amplitude value(s) of combination coefficients in a $q_2^{th}$ combination coefficient group; a phase quantization bit quantity $B_{q1}$ used by the combination coefficients in the $q_1^{th}$ combination coefficient group is greater than a phase quantization bit quantity $B_{q2}$ used by the combination coefficients in the $q_2^{th}$ combination coefficient group; $q_1$ is not equal to $q_2$; and $q_1$ and $q_2$ are integers greater than or equal to 1 and less than or equal to Q.

In another optional implementation, that the grouping unit 202 groups the K combination coefficients based on the amplitude value of each of the K combination coefficients, to obtain the Q combination coefficient groups is: determining, in the K combination coefficients, one or more combination coefficients corresponding to each of l spatial domain beam base vectors, where l is a positive integer less than or equal to L; grouping the l spatial domain beam base vectors based on sum of amplitude value(s), a maximum amplitude value, or a sum of power of the one or more combination coefficients corresponding to each spatial domain beam base vector, to obtain Q spatial domain beam base vector groups; and for one or more spatial domain beam base vectors in each of the Q spatial domain beam base vector groups, determining all combination coefficients corresponding to the one or more spatial domain beam base vectors as one combination coefficient group, to obtain the Q combination coefficient groups corresponding to the Q spatial domain beam base vector groups.

Optionally, sum of amplitude value(s), a maximum amplitude value, and a sum of power of a combination coefficient corresponding to each spatial domain beam base vector in a $q_1^{th}$ spatial domain beam base vector group corresponding to a $q_1^{th}$ combination coefficient group are respectively greater than sum of amplitude value(s), a maximum amplitude value, and a sum of power of a combination coefficient corresponding to any spatial domain beam base vector in a $q_2^{th}$ spatial domain beam base vector group corresponding to a $q_2^{th}$ combination coefficient group; a phase quantization bit quantity $B_{q1}$ used by each combination coefficient in the $q_1^{th}$ combination coefficient group is greater than a phase quantization bit quantity $B_{q2}$ used by each combination coefficient in the $q_2^{th}$ combination coefficient group; $q_1$ is not equal to $q_2$; and $q_1$ and $q_2$ are integers greater than or equal to 1 and less than or equal to Q.

In still another optional implementation, that the grouping unit 202 groups the K combination coefficients based on the amplitude value of each of the K combination coefficients, to obtain the Q combination coefficient groups is: determining, in the K combination coefficients, one or more combination coefficients corresponding to each of m frequency-domain base vectors, where m is a positive integer less than or equal to M; grouping the m frequency-domain base vectors based on sum of amplitude value(s), a maximum amplitude value, or a sum of power of the one or more combination coefficients corresponding to each frequency-domain base vector, to obtain Q frequency-domain base vector groups; and for one or more frequency-domain base vectors in each of the Q frequency-domain base vector groups, determining all combination coefficients corresponding to the one or more frequency-domain base vectors as one combination coefficient group, to obtain the Q combination coefficient groups corresponding to the Q frequency-domain base vector groups.

Optionally, sum of amplitude value(s), a maximum amplitude value, and a sum of power of a combination coefficient corresponding to each frequency-domain base vector in a $q_1^{th}$ frequency-domain base vector group corresponding to a $q_1^{th}$ combination coefficient group are respectively greater than sum of amplitude value(s), a maximum amplitude value, and a sum of power of a combination coefficient corresponding to any frequency-domain base vector in a $q_2^{th}$ frequency-domain base vector group corresponding to a $q_2^{th}$ combination coefficient group; a phase quantization bit quantity $B_{q1}$ used by each combination coefficient in the $q_1^{th}$ combination coefficient group is greater than a phase quantization bit quantity $B_{q2}$ used by each combination coefficient in the $q_2^{th}$ combination coefficient group; $q_1$ is not equal to $q_2$; and $q_1$ and $q_2$ are integers greater than or equal to 1 and less than or equal to Q.

In still another optional implementation, that the grouping unit 202 groups the K combination coefficients based on the amplitude value of each of the K combination coefficients, to obtain the Q combination coefficient groups is: determining, in the K combination coefficients, one or more combination coefficients corresponding to each of l spatial domain beam base vectors, where l is a positive integer less than or equal to L; for the one or more combination coefficients corresponding to each spatial domain beam base vector, grouping the one or more combination coefficients based on a descending order or ascending order of an amplitude value of each combination coefficient, to obtain the Q combination coefficient groups corresponding to each spatial domain beam base vector; and combining a $q^{th}$ combination coefficient group corresponding to each of the l spatial domain beam base vectors, to obtain a $q^{th}$ combination coefficient group in the Q combination coefficient groups of the K combination coefficients, where q is an integer equal to 1, 2, . . . , or Q.

Optionally, in the Q combination coefficient groups corresponding to each spatial domain beam base vector, a minimum amplitude value, a maximum amplitude value, or sum of amplitude value(s) of a $q_1^{th}$ combination coefficient group is greater than a minimum amplitude value, a maximum amplitude value, or sum of amplitude value(s) of a $q_2$th combination coefficient group; in the Q combination coefficient groups of the K combination coefficients, a phase quantization bit quantity $B_{q1}$ used by the $q_1^{th}$ combination coefficient group is greater than a phase quantization bit quantity $B_{q2}$ used by the $q_2^{th}$ combination coefficient group; $q_1$ is not equal to $q_2$; and $q_1$ and $q_2$ are integers greater than or equal to 1 and less than or equal to Q.

In an optional implementation, the amplitude value of each of the K combination coefficients is determined by performing quantization by using a quantization bit quantity $A_1$, and $A_1$ is an integer greater than or equal to 2.

In another optional implementation, the precoding matrix indication information further includes an average amplitude value or a maximum amplitude value corresponding to each of the l spatial domain beam base vector; l is a positive integer less than or equal to L; and the l spatial domain beam base vectors are spatial domain beam base vectors corresponding to all of the K combination coefficients; the amplitude value of each of the K combination coefficients is determined with reference to an average amplitude value or a maximum amplitude value of each spatial domain beam base vector corresponding to each combination coefficient and by performing differential quantization by using a quantization bit quantity $A_3$; $A_3$ is an integer greater than or equal to 1; and the average amplitude value or the maximum amplitude value of each spatial domain beam base vector is an average amplitude value or a maximum amplitude value of one or more combination coefficients corresponding to each spatial domain beam base vector in the K combination coefficients; and the average amplitude value or the maximum amplitude value corresponding to each spatial domain beam base vector is determined by performing quantization by using an amplitude quantization bit quantity $A_2$, and $A_2$ is an integer greater than or equal to 2.

In this embodiment, in the precoding matrix indication information, the average amplitude values or the maximum amplitude values corresponding to all of the l spatial domain beam base vectors are located before the amplitude values of all of the K combination coefficients; and in the precoding matrix indication information, the average amplitude values or the maximum amplitude values corresponding to the spatial domain beam base vectors are arranged based on a descending order or ascending order of indexes of the spatial domain beam base vectors.

In this embodiment, in the precoding matrix indication information, the amplitude values of all of the K combination coefficients are located before the phase values of all the combination coefficients;

in the precoding matrix indication information, the amplitude values of all of the K combination coefficients are sequentially arranged based on a descending order or ascending order of indexes of the spatial domain beam base vectors corresponding to the combination coefficients or indexes of the frequency-domain base vectors corresponding to the combination coefficients; and in the precoding matrix indication information, the phase values of all of the K combination coefficients are sequentially arranged based on a descending order or ascending order of indexes of the spatial domain beam base vectors corresponding to the combination coefficients or indexes of the frequency-domain base vectors corresponding to the combination coefficients; or in the precoding matrix indication information, for the Q combination coefficient groups to which the K combination coefficients respectively belong, phase values of the combination coefficient groups are sequentially arranged based on a descending order or ascending order of indexes of the combination coefficient groups; and in a phase indication of each combination coefficient group, phase indications of combination coefficients are sequentially arranged based on a descending order or ascending order of indexes of spatial domain beam base vectors corresponding to the combination coefficients or indexes of frequency-domain base vectors corresponding to the combination coefficients.

Figure 4:
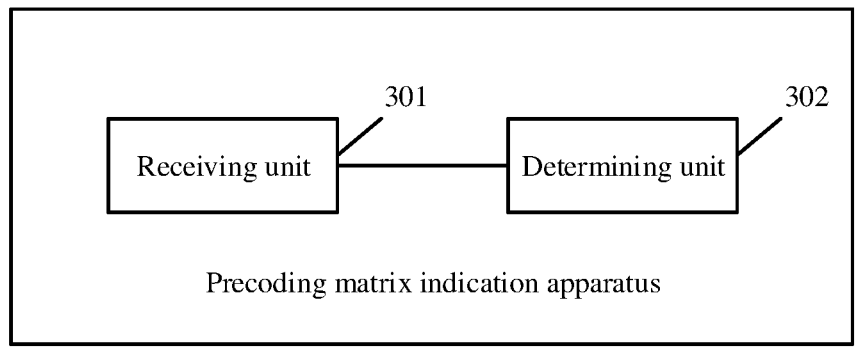
FIG. 4 is a schematic structural diagram of another precoding matrix indication apparatus according to an embodiment.

FIG. 4 shows another precoding matrix indication apparatus disclosed in an embodiment. The precoding matrix indication apparatus may be located in a receive end. The precoding matrix indication apparatus includes a receiving unit 301 and a determining unit 302. The determining unit 302 may also be a processing unit.

The receiving unit 301 is configured to receive precoding matrix indication information, where the precoding matrix indication information includes an amplitude value and a phase value of each of K combination coefficients.

The determining unit 302 is configured to determine the amplitude value and the phase value of each of the K combination coefficients based on the precoding matrix indication information.

The amplitude value of each combination coefficient is determined by using a same amplitude quantization bit quantity and a same amplitude quantization rule; K is a positive integer less than or equal to L*M; L is a total quantity of spatial domain beam base vectors that is determined by the transmit end; and M is a total quantity of frequency-domain base vectors that is determined by the transmit end; and Q combination coefficient groups to which the K combination coefficients respectively belong are obtained through grouping based on the amplitude values of the K combination coefficients; the phase value of each combination coefficient is determined based on a phase quantization bit quantity and a phase quantization rule that are used by a combination coefficient group to which each combination coefficient belongs; and phase quantization bit quantities and/or phase quantization rules used by at least two of the Q combination coefficient groups are different.

In an optional implementation, the Q combination coefficient groups to which the K combination coefficients respectively belong are obtained by grouping the K combination coefficients based on a descending order or ascending order of the amplitude values of all of the K combination coefficients.

Optionally, in the Q combination coefficient groups, a minimum amplitude value, a maximum amplitude value, or sum of amplitude value(s) of combination coefficients in a $q_1^{th}$ combination coefficient group is greater than a minimum amplitude value, a maximum amplitude value, or sum of amplitude value(s) of combination coefficients in a $q_2^{th}$ combination coefficient group; a phase quantization bit quantity $B_{q1}$ used by the combination coefficients in the $q_1^{th}$ combination coefficient group is greater than a phase quantization bit quantity $B_{q2}$ used by the combination coefficients in the $q_2^{th}$ combination coefficient group; $q_1$ is not equal to $q_2$; and $q_1$ and $q_2$ are integers greater than or equal to 1 and less than or equal to Q.

In another optional implementation, each of the Q combination coefficient groups to which the K combination coefficients respectively belong includes all combination coefficients corresponding to spatial domain beam base vectors in each spatial domain beam base vector group; the spatial domain beam base vector groups are obtained by grouping l spatial domain beam base vectors based on sum of amplitude value(s), a maximum amplitude value, or a sum of power of one or more combination coefficients corresponding to each of the l spatial domain beam base vectors in the K combination coefficients; and l is a positive integer less than or equal to L.

Optionally, in the Q combination coefficient groups, sum of amplitude value(s), a maximum amplitude value, and a sum of power of a combination coefficient corresponding to each spatial domain beam base vector in a $q_1^{th}$ spatial domain beam base vector group corresponding to a $q_1^{th}$ combination coefficient group are respectively greater than sum of amplitude value(s), a maximum amplitude value, and a sum of power of a combination coefficient corresponding to any spatial domain beam base vector in a $q_2^{th}$ spatial domain beam base vector group corresponding to a $q_2^{th}$ combination coefficient group; a phase quantization bit quantity $B_{q1}$ used by each combination coefficient in the $q_1^{th}$ combination coefficient group is greater than a phase quantization bit quantity $B_{q2}$ used by each combination coefficient in the $q_2^{th}$ combination coefficient group; $q_1$ is not equal to $q_2$; and $q_1$ and $q_2$ are integers greater than or equal to 1 and less than or equal to Q.

In still another optional implementation, each of the Q combination coefficient groups to which the K combination coefficients respectively belong includes all combination coefficients corresponding to frequency-domain base vectors in each of the Q frequency-domain base vector groups; the Q frequency-domain base vector groups are obtained by grouping the M frequency-domain base vectors based on sum of amplitude value(s), a maximum amplitude value, or a sum of power of one or more combination coefficients corresponding to each of m frequency-domain base vectors in the K combination coefficients; and m is a positive integer less than or equal to M.

Optionally, in the Q combination coefficient groups, sum of amplitude value(s), a maximum amplitude value, and a sum of power of a combination coefficient corresponding to each frequency-domain base vector in a $q_1^{th}$ frequency-domain base vector group corresponding to a $q_1^{th}$ combination coefficient group are respectively greater than sum of amplitude value(s), a maximum amplitude value, and a sum of power of a combination coefficient corresponding to any frequency-domain base vector in a $q_2^{th}$ frequency-domain base vector group corresponding to a $q_2^{th}$ combination coefficient group; a phase quantization bit quantity $B_{q1}$ used by each combination coefficient in the $q_1^{th}$ combination coefficient group is greater than a phase quantization bit quantity $B_{q2}$ used by each combination coefficient in the $q_2^{th}$ combination coefficient group; $q_1$ is not equal to $q_2$; and $q_1$ and $q_2$ are integers greater than or equal to 1 and less than or equal to Q.

In still another optional implementation, a $q^{th}$ combination coefficient group in the Q combination coefficient groups to which the K combination coefficients respectively belong is obtained by combining combination coefficient(s) in a $q^{th}$ combination coefficient group in Q combination coefficient groups corresponding to each of l spatial domain beam base vectors; l is a positive integer less than or equal to L; and q is an integer equal to 1, 2, . . . , or Q; and the Q combination coefficient groups corresponding to each of the l spatial domain beam base vectors are obtained by grouping, for one or more combination coefficients corresponding to each spatial domain beam base vector, the one or more combination coefficients based on a descending order or ascending order of an amplitude value of each combination coefficient.

Optionally, in the Q combination coefficient groups corresponding to each spatial domain beam base vector, a minimum amplitude value, a maximum amplitude value, or sum of amplitude value(s) of a $q_1^{th}$ combination coefficient group is greater than a minimum amplitude value, a maximum amplitude value, or sum of amplitude value(s) of a $q_2$th combination coefficient group; in the Q combination coefficient groups of the K combination coefficients, a phase quantization bit quantity $B_{q1}$ used by the $q_1{}^{th}$ combination coefficient group is greater than a phase quantization bit quantity $B_{q2}$ used by the $q_2{}^{th}$ combination coefficient group; $q_1$ is not equal to $q_2$; and $q_1$ and $q_2$ are integers greater than or equal to 1 and less than or equal to Q.

In an optional implementation, the amplitude value of each of the K combination coefficients is determined by performing quantization by using a quantization bit quantity $A_1$, and $A_1$ is an integer greater than or equal to 2.

In another optional implementation, the precoding matrix indication information further includes an average amplitude value or a maximum amplitude value corresponding to each of the l spatial domain beam base vector; l is a positive integer less than or equal to L; and the l spatial domain beam base vectors are spatial domain beam base vectors corresponding to all of the K combination coefficients;

the amplitude value of each of the K combination coefficients is determined with reference to an average amplitude value or a maximum amplitude value of each spatial domain beam base vector corresponding to each combination coefficient and by performing differential quantization by using a quantization bit quantity $A_3$; $A_3$ is an integer greater than or equal to 1; and the average amplitude value or the maximum amplitude value of each spatial domain beam base vector is an average amplitude value or a maximum amplitude value of one or more combination coefficients corresponding to each spatial domain beam base vector in the K combination coefficients; and the average amplitude value or the maximum amplitude value corresponding to each spatial domain beam base vector is determined by performing quantization by using an amplitude quantization bit quantity $A_2$, and $A_2$ is an integer greater than or equal to 2.

Optionally, in the precoding matrix indication information, the average amplitude values or the maximum amplitude values corresponding to all of the l spatial domain beam base vectors are located before the amplitude values of all of the K combination coefficients; and the average amplitude values or the maximum amplitude values corresponding to the spatial domain beam base vectors are arranged based on a descending order or ascending order of indexes of the spatial domain beam base vectors.

Optionally, in the precoding matrix indication information, the amplitude values of all of the K combination coefficients are located before the phase values of all the combination coefficients;

in the precoding matrix indication information, the amplitude values of all of the K combination coefficients are sequentially arranged based on a descending order or ascending order of indexes of the spatial domain beam base vectors corresponding to the combination coefficients or indexes of the frequency-domain base vectors corresponding to the combination coefficients; and in the precoding matrix indication information, the phase values of all of the K combination coefficients are sequentially arranged based on a descending order or ascending order of indexes of the spatial domain beam base vectors corresponding to the combination coefficients or indexes of the frequency-domain base vectors corresponding to the combination coefficients; or in the precoding matrix indication information, for the Q combination coefficient groups to which the K combination coefficients respectively belong, phase values of the combination coefficient groups are sequentially arranged based on a descending order or ascending order of indexes of the combination coefficient groups; and in a phase indication of each combination coefficient group, phase indications of combination coefficients are sequentially arranged based on a descending order or ascending order of indexes of spatial domain beam base vectors corresponding to the combination coefficients or indexes of frequency-domain base vectors corresponding to the combination coefficients.

Figure 5:
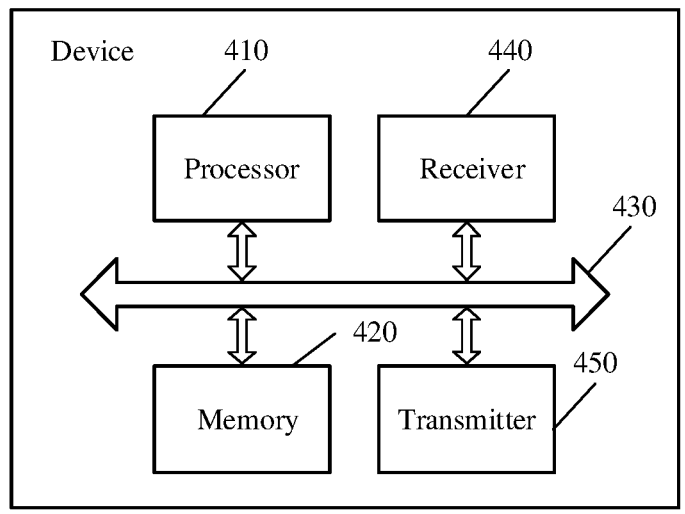
FIG. 5 is a schematic structural diagram of a device according to an embodiment.

FIG. 5 is a schematic diagram of a device according to an embodiment. As shown in FIG. 5, the device may be a terminal device, or may be a chip or a circuit, for example, a chip or a circuit that can be disposed in a terminal device. The device may correspond to a related operation of the transmit end in the foregoing method.

The device may include a processor 410 and a memory 420. The memory 420 is configured to store instructions, and the processor 410 is configured to execute the instructions stored in the memory 420, to implement the steps performed by the transmit end, or implement related operations performed by the units in the precoding matrix indication apparatus shown in FIG. 3.

Further, the device may include a receiver 440 and a transmitter 450. Further, the device may further include a bus system 430. The processor 410, the memory 420, the receiver 440, and the transmitter 450 may be connected by using the bus system 430.

The processor 410 is configured to execute the instructions stored in the memory 420, to control the receiver 440 to receive a signal and control the transmitter 450 to send a signal, to complete the steps of the transmit end in the foregoing method, for example, sending the precoding matrix indication information. The receiver 440 and the transmitter 450 may be a same physical entity or different physical entities. When the receiver 440 and the transmitter 450 are a same physical entity, the receiver 440 and the transmitter 450 may be collectively referred to as a transceiver. The memory 420 may be integrated into the processor 410, or may be disposed separately from the processor 410.

In addition, the memory 420 is further configured to store the predefined information in the foregoing method embodiment, or information notified by a network device such as a base station.

In an implementation, it may be considered that functions of the receiver 440 and the transmitter 450 are implemented by using a transceiver circuit or a dedicated transceiver chip. It may be considered that the processor 410 is implemented by using a dedicated processing chip, a processing circuit, a processor, or a general-purpose chip.

In another implementation, it may be considered that a related operation of the transmit end provided in the embodiments is implemented by using a general-purpose computer. For example, program code for implementing functions of the processor 410, the receiver 440, and the transmitter 450 is stored in the memory. A general-purpose processor implements the functions of the processor 410, the receiver 440, and the transmitter 450 by executing the code in the memory. For example, the processor 410 invokes the program code in the memory 420, to perform a related operation of the transmit end in the foregoing method embodiment.

Figure 6:
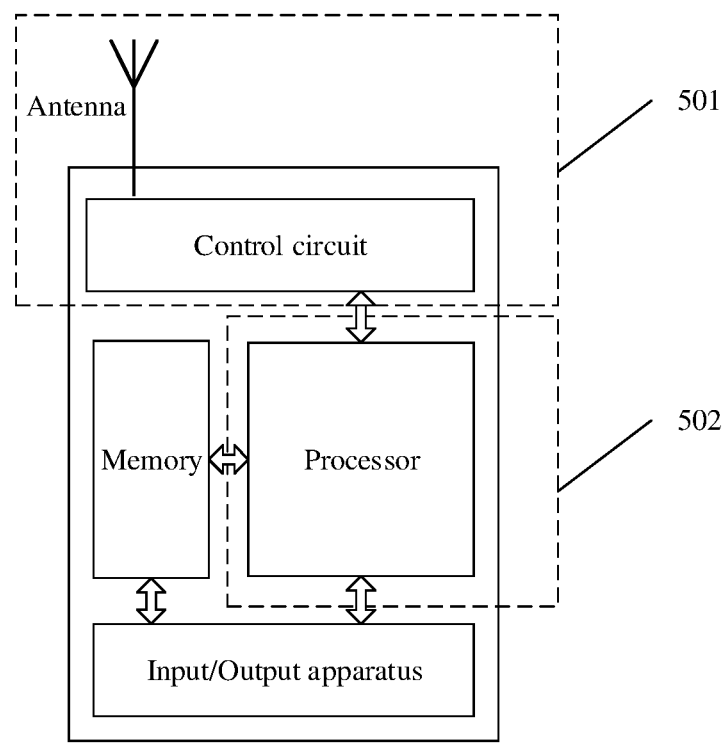
FIG. 6 is a schematic structural diagram of a terminal device according to an embodiment.

FIG. 6 is a schematic structural diagram of a terminal device according to an embodiment. The terminal device may be applied to the system shown in FIG. 1. For ease of description, FIG. 6 shows only main components of the terminal device. As shown in FIG. 6, the terminal device includes a processor, a memory, a control circuit, an antenna, and an input/output apparatus. The processor is mainly configured to: process a communication protocol and communication data, control the entire terminal device, execute a software program, and process data of the software program, for example, configured to support the terminal device in performing an action of the transmit end that is described in the foregoing method embodiment. The memory is mainly configured to store the software program and the data, for example, the predefined information in the foregoing method embodiment, or information notified by a network device such as a base station. The control circuit is mainly configured to: perform conversion between a baseband signal and a radio frequency signal, and process the radio frequency signal. The control circuit and the antenna may also be collectively referred to as a transceiver, and are mainly configured to receive and send a radio frequency signal in a form of an electromagnetic wave, for example, receive channel state measurement information configured by the network device, and send precoding matrix indication information to the network device. The input/output apparatus, such as a touchscreen, a display screen, or a keyboard, is mainly configured to: receive data entered by a user, and output data to the user.

After the terminal device is powered on, the processor may read a software program in a storage unit, interpret and execute an instruction of the software program, and process data of the software program, for example, perform a related operation of the transmit end in the foregoing method embodiment. In a process of performing the related operation of the transmit end in the foregoing method embodiment, when the processor needs to wirelessly send data, after performing baseband processing on to-be-sent data, the processor outputs a baseband signal to a radio frequency circuit; and the radio frequency circuit performs radio frequency processing on the baseband signal and then sends a radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person of ordinary skill in the art may understand that for ease of description, FIG. 6 shows only one memory and one processor. An actual terminal device may have a plurality of processors and a plurality of memories. The memory may also be referred to as a storage medium, a storage device, or the like. This is not limited in this embodiment.

In an optional implementation, the processor may include a baseband processor and a central processing unit. The baseband processor is mainly configured to process a communications protocol and communication data. The central processing unit is mainly configured to: control the entire terminal device, execute a software program, and process data of the software program. The processor in FIG. 6 integrates functions of the baseband processor and the central processing unit. A person of ordinary skill in the art may understand that the baseband processor and the central processing unit may be processors independent of each other, and are interconnected by using technologies such as a bus. A person of ordinary skill in the art may understand that the terminal device may include a plurality of baseband processors to adapt to different network standards, the terminal device may include a plurality of central processing units to improve a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communications protocol and the communication data may be built in the processor, or may be stored in the storage unit in a form of a software program. The processor executes the software program, to implement a baseband processing function.

For example, in this embodiment, the antenna having a transceiver function and the control circuit may be considered as a communications unit or a transceiver unit of the terminal device, and the processor having a processing function may be considered as a determining unit or a processing unit of the terminal device. As shown in FIG. 6, the terminal device includes a transceiver unit 501 and a processing unit 502. The transceiver unit may also be referred to as a transceiver, a transceiver machine, a transceiver apparatus, or the like. Optionally, a component that is in the transceiver unit 501 and that is configured to implement a receiving function may be considered as a receiving unit, and a component that is in the transceiver unit 501 and that is configured to implement a sending function may be considered as a sending unit. In other words, the transceiver unit 501 includes the receiving unit and the sending unit. For example, the receiving unit may also be referred to as a receiver, a receiving circuit, or the like, and the sending unit may be referred to as a transmitter, a transmitting circuit, or the like.

Figure 7:
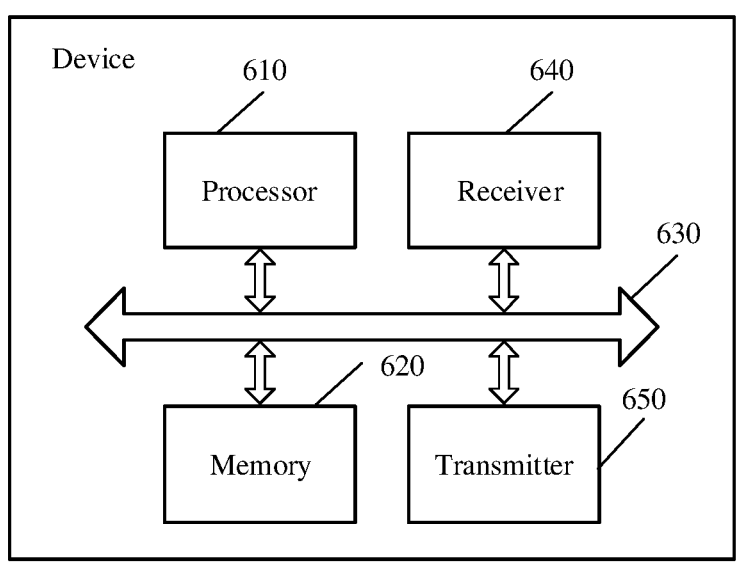
FIG. 7 is a schematic structural diagram of another device according to an embodiment.

FIG. 7 is a schematic structural diagram of a device according to an embodiment. As shown in FIG. 7, the device may be a network device; or the device may be a chip or a circuit, for example, a chip or a circuit that can be disposed in a receive end. The device performs a related operation of the receive end in the foregoing method. The device may include a processor 610 and a memory 620. The memory 620 is configured to store instructions, and the processor 610 is configured to execute the instructions stored in the memory 620, to enable the device to implement a related operation of the receive end, for example, receiving precoding matrix indication information and determining an amplitude value and a phase value of each combination coefficient.

Further, the network device may further include a receiver 640 and a transmitter 650. Further, the network device may further a bus system 630.

The processor 610, the memory 620, the receiver 640, and the transmitter 650 are connected through the bus system 630. The processor 610 is configured to execute the instructions stored in the memory 620, to control the receiver 640 to receive a signal and control the transmitter 650 to send the signal, to complete the steps of the network device in the foregoing methods. The receiver 640 and the transmitter 650 may be a same physical entity or different physical entities. When the receiver 640 and the transmitter 650 are a same physical entity, the receiver 640 and the transmitter 650 may be collectively referred to as a transceiver. The memory 620 may be integrated into the processor 610, or may be disposed separately from the processor 610.

In an implementation, it may be considered that functions of the receiver 640 and the transmitter 650 are implemented by using a transceiver circuit or a dedicated transceiver chip. It may be considered that the processor 610 is implemented by using a dedicated processing chip, a processing circuit, a processor, or a general-purpose chip.

In another implementation, it may be considered that a related operation of the receive end provided in the embodiments is implemented by using a general-purpose computer. For example, program code for implementing functions of the processor 610, the receiver 640, and the transmitter 650 is stored in the memory. A general-purpose processor implements the functions of the processor 610, the receiver 640, and the transmitter 650 by executing the code in the memory. For example, the processor 610 may invoke the program code in the memory 620, or a computer or a network device performs, based on the receiver 640 and the transmitter 650, related operations of the receiving unit, the determining unit, and the like in the embodiment shown in FIG. 4, or may perform a related operation or implementation performed by the receive end in the foregoing method embodiment.

For concepts, explanations, detailed descriptions, and other steps related to the solutions provided in this embodiment and related to the device, refer to related descriptions of the content in the foregoing method or another embodiment. Details are not described herein again.

Figure 8:
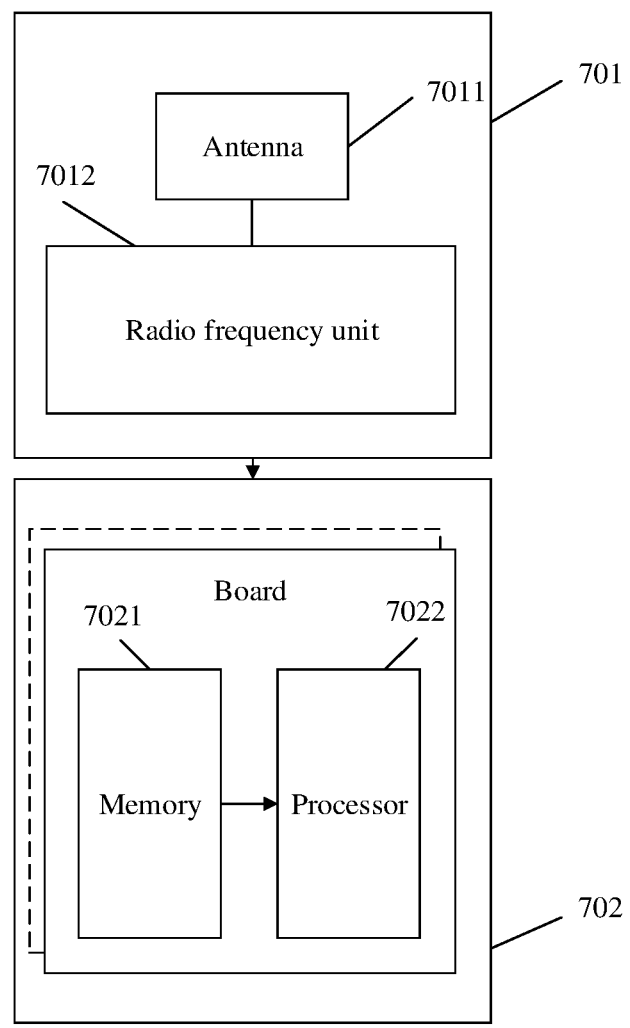
FIG. 8 is a schematic structural diagram of a network device according to an embodiment.

FIG. 8 is a schematic structural diagram of a network device according to an embodiment. The network device may be a base station, and may perform a related operation of the receive end in the foregoing method embodiment, for example, operations of sending measurement configuration information of related channel state information to a terminal device, and receiving precoding matrix indication information reported by the terminal device. A structure of a base station is used as an example for description in FIG. 8. As shown in FIG. 8, the base station may be applied to the system shown in FIG. 1. The base station includes one or more radio frequency units, such as a remote radio unit (RRU) 701 and one or more baseband units (BBU) (which may also be referred to as a digital unit (DU)) 702. The RRU 701 may be referred to as a transceiver unit, a transceiver machine, a transceiver circuit, a transceiver, or the like, and may include at least one antenna 7011 and a radio frequency unit 7012. The RRU 701 is mainly configured to: send and receive a radio frequency signal and perform conversion between a radio frequency signal and a baseband signal. For example, the RRU 701 is configured to receive the precoding matrix indication information reported by the terminal device in the foregoing embodiments. The BBU 702 is mainly configured to: perform baseband processing, control the base station, and so on. The RRU 701 and the BBU 702 may be physically disposed together, or may be physically separated, namely, a distributed base station.

The BBU 702 is a control center of the base station, may also be referred to as a processing unit, and is mainly configured to complete a baseband processing function such as channel coding, multiplexing, modulation, or spectrum spreading. For example, the BBU (processing unit) may be configured to control the base station to perform an operation procedure of the receive end in the foregoing method embodiment.

In an example, the BBU 702 may include one or more boards, and a plurality of boards may jointly support a radio access network of a single access standard (such as an LTE network), or may separately support radio access networks of different access standards. The BBU 702 further includes a memory 7021 and a processor 7022. The memory 7021 is configured to store necessary instructions and data. For example, the memory 7021 stores predefined content in the foregoing embodiments. The processor 7022 is configured to control the base station to perform necessary actions. For example, the processor 7022 is configured to control the base station to perform an operation procedure related to the receive end in the foregoing method embodiment. The memory 7021 and the processor 7022 may serve one or more boards. In other words, a memory and a processor may be independently disposed on each board. Alternatively, a plurality of boards may share a same memory and a same processor. In addition, a necessary circuit may be further disposed on each board.

According to the methods provided in the embodiments, an embodiment further provides a communications system, including the foregoing receive end and one or more transmit ends.

It should be understood that in the embodiments, the processor may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

The memory may include a read-only memory and a random access memory, and provide instructions and data to the processor. A part of the memory may further include a non-volatile random access memory.

In addition to a data bus, the bus system may further include a power bus, a control bus, a status signal bus, and the like. However, for clear description, various types of buses in the figure are marked as the bus system.

In addition, the embodiments further provide a computer-readable storage medium. The computer-readable storage medium stores computer instructions. When the computer instructions are run on a computer, the computer is enabled to perform a corresponding operation and/or procedure performed by the transmit end in the precoding matrix indication method in the embodiments, or the computer is enabled to perform a corresponding operation and/or procedure performed by the receive end in the precoding matrix indication method in the embodiments.

The embodiments further provide a computer program product. The computer program product includes computer program code. When the computer program code is run on a computer, the computer is enabled to perform a corresponding operation and/or procedure performed by the transmit end in the precoding matrix indication method in the embodiments, or the computer is enabled to perform a corresponding operation and/or procedure performed by the receive end in the precoding matrix indication method in the embodiments.

The embodiments further provide a chip, including a processor. The processor is configured to invoke and run a computer program stored in a memory, to perform a corresponding operation and/or procedure performed by the transmit end in the precoding matrix indication method in the embodiments, or perform a corresponding operation and/or procedure performed by the receive end in the precoding matrix indication method in the embodiments. Optionally, the chip further includes the memory. The memory is connected to the processor through a circuit or a cable. The processor is configured to read and execute the computer program in the memory. Further, optionally, the chip further includes a communications interface. The processor is connected to the communications interface. The communications interface is configured to receive data and/or information that need/needs to be processed. The processor obtains the data and/or the information from the communications interface, and processes the data and/or the information. The communications interface may be an input/output interface.

In an implementation process, steps in the foregoing methods may be implemented by using a hardware integrated logic circuit in the processor, or by using instructions in a form of software. The steps of the methods disclosed with reference to the embodiments may be directly performed by a hardware processor or may be performed by a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be understood that, in the embodiments, sequence numbers of the foregoing processes do not mean execution sequences. The execution sequences of the processes should be determined based on functions and internal logic of the processes, and should not be construed as any limitation on the implementation processes of the embodiments.

A person of ordinary skill in the art may be aware that, various illustrative logical blocks and steps that are described with reference to the embodiments may be implemented by electronic hardware or a combination of computer software and electronic hardware. Whether the functions are performed by hardware or software depends on particular applications and design constraint conditions of the solutions. A person of ordinary skill in the art may use different methods to implement the described functions for each particular application, but it should not be considered that such implementation goes beyond the scope of the embodiments.

It may be clearly understood by a person of ordinary skill in the art that, for the purpose of convenient and brief description, for a detailed working process of the foregoing system, apparatus, and unit, refer to a corresponding process in the foregoing method embodiment, and details are not described herein again.

In the several embodiments provided, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions in the embodiments.

In addition, functional units in the embodiments may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, all or some of the procedures or the functions according to the embodiments are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The foregoing descriptions are merely implementations, but are not intended as limiting. Any variation or replacement readily figured out by a person of ordinary skill in the art within the scope disclosed in the embodiments shall fall within the scope of the embodiments.

What is claimed is:

1. A precoding matrix indication method, comprising:
determining, by a transmit end, an amplitude value of each of K combination coefficients corresponding to each spatial layer, wherein the amplitude value of each combination coefficient is determined by using a same amplitude quantization bit quantity and a same amplitude quantization rule; K is a positive integer less than or equal to L*M; L is a total quantity of spatial domain beam base vectors that is determined by the transmit end; and M is a total quantity of frequency-domain base vectors that is determined by the transmit end; wherein the same amplitude quantization rule comprises logic defining whether a same amplitude is considered a larger amplitude value or a smaller amplitude value for purposes of grouping combination coefficients having the same amplitude;
grouping, by the transmit end, the K combination coefficients based on the amplitude value of each of the K combination coefficients, to obtain Q combination coefficient groups, wherein Q is an integer greater than or equal to 2, wherein grouping comprises identifying at least two combination coefficients in the K combination coefficients having the same amplitude, and sorting a first one of the at least two combination coefficients into a first coefficient group associated with larger amplitude values and sorting a second one of the at least two combination coefficients into a second coefficient group associated with smaller amplitude values based on the same amplitude quantization rule;

determining, by the transmit end, a phase value of each combination coefficient in each combination coefficient group, wherein at least one of phase quantization bit quantities or phase quantization rules used by at least two of the Q combination coefficient groups are different; and sending, by the transmit end, precoding matrix indication information, wherein the precoding matrix indication information comprises the amplitude value and the phase value of each of the K combination coefficients.

2. The method according to claim 1, wherein the grouping, by the transmit end, of the K combination coefficients based on the amplitude value of each of the K combination coefficients, to obtain Q combination coefficient groups comprises:

grouping, by the transmit end, the K combination coefficients based on a descending order or ascending order of the amplitude values of all of the K combination coefficients, to obtain the Q combination coefficient groups.

3. The method according to claim 2, wherein in the Q combination coefficient groups, a minimum amplitude value, a maximum amplitude value, or sum of amplitude value(s) of combination coefficients in a q1th combination coefficient group is greater than a minimum amplitude value, a maximum amplitude value, or sum of amplitude value(s) of combination coefficients in a q2th combination coefficient group; a phase quantization bit quantity Bq1 used by the combination coefficients in the q1th combination coefficient group is greater than a phase quantization bit quantity Bq2 used by the combination coefficients in the q2th combination coefficient group; q1 is not equal to q2; and q1 and q2 are integers greater than or equal to 1 and less than or equal to Q.

4. The method according to claim 1, wherein the grouping, by the transmit end, of the K combination coefficients based on the amplitude value of each of the K combination coefficients, to obtain Q combination coefficient groups comprises:

determining, by the transmit end in the K combination coefficients, one or more combination coefficients corresponding to each of spatial domain beam base vectors, wherein is a positive integer less than or equal to L;

grouping, by the transmit end, the spatial domain beam base vectors based on a descending order or ascending order of sum of amplitude value(s), a maximum amplitude value, or a sum of power of the one or more combination coefficients corresponding to each spatial domain beam base vector, to obtain Q spatial domain beam base vector groups; and for one or more spatial domain beam base vectors in each of the Q spatial domain beam base vector groups, determining, by the transmit end, all combination coefficients corresponding to the one or more spatial domain beam base vectors as one combination coefficient group, to obtain the Q combination coefficient groups corresponding to the Q spatial domain beam base vector groups.

5. The method according to claim 1, wherein in the precoding matrix indication information, the amplitude values of all of the K combination coefficients are located before the phase values of all the combination coefficients;

in the precoding matrix indication information, the amplitude values of all of the K combination coefficients are sequentially arranged based on a descending order or ascending order of indexes of the spatial domain beam base vectors corresponding to the combination coefficients or indexes of the frequency-domain base vectors corresponding to the combination coefficients; and in the precoding matrix indication information, the phase values of all of the K combination coefficients are sequentially arranged based on a descending order or ascending order of indexes of the spatial domain beam base vectors corresponding to the combination coefficients or indexes of the frequency-domain base vectors corresponding to the combination coefficients; or in the precoding matrix indication information, for the Q combination coefficient groups to which the K combination coefficients respectively belong, phase values of the combination coefficient groups are sequentially arranged based on a descending order or ascending order of indexes of the combination coefficient groups; and in a phase indication of each combination coefficient group, phase indications of combination coefficients are sequentially arranged based on a descending order or ascending order of indexes of spatial domain beam base vectors corresponding to the combination coefficients or indexes of frequency-domain base vectors corresponding to the combination coefficients.

6. A precoding matrix indication method, comprising:

receiving, by a receive end, precoding matrix indication information, wherein the precoding matrix indication information comprises an amplitude value and a phase value of each of K combination coefficients; and determining, by the receive end, the amplitude value and the phase value of each of the K combination coefficients based on the precoding matrix indication information, wherein the amplitude value of each combination coefficient is determined by using a same amplitude quantization bit quantity and a same amplitude quantization rule; K is a positive integer less than or equal to L*M; L is a total quantity of spatial domain beam base vectors that is determined by a transmit end; and M is a total quantity of frequency-domain base vectors that is determined by the transmit end; wherein the same amplitude quantization rule comprises logic defining whether a same amplitude is considered a larger amplitude value or a smaller amplitude value for purposes of grouping combination coefficients having the same amplitude; and Q combination coefficient groups to which the K combination coefficients respectively belong are obtained through grouping based on the amplitude values of the K combination coefficients, wherein grouping comprises identifying at least two combination coefficients in the K combination coefficients having the same amplitude, and sorting a first one of the at least two combination coefficients into a first coefficient group associated with larger amplitude values and sorting a second one of the at least two combination coefficients into a second coefficient group associated with smaller amplitude values based on the same amplitude quantization rule; the phase value of each combination coefficient is determined based on a phase quantization bit quantity and a phase quantization rule that are used by a combination coefficient group to which each combination coefficient belongs; and at least one of phase quantization bit quantities or phase quantization rules used by at least two of the Q combination coefficient groups are different.

7. The method according to claim 6, wherein the Q combination coefficient groups to which the K combination coefficients respectively belong are obtained by grouping the K combination coefficients based on a descending order or ascending order of the amplitude values of all of the K combination coefficients.

8. The method according to claim 7, wherein
in the Q combination coefficient groups, a minimum amplitude value, a maximum amplitude value, or sum of amplitude value(s) of combination coefficients in a q1th combination coefficient group is greater than a minimum amplitude value, a maximum amplitude value, or sum of amplitude value(s) of combination coefficients in a q2th combination coefficient group; a phase quantization bit quantity Bq1 used by the combination coefficients in the q1th combination coefficient group is greater than a phase quantization bit quantity Bq2 used by the combination coefficients in the q2th combination coefficient group; q1 is not equal to q2; and q1 and q2 are integers greater than or equal to 1 and less than or equal to Q.

9. The method according to claim 6, wherein each of the Q combination coefficient groups to which the K combination coefficients respectively belong comprises all combination coefficients corresponding to spatial domain beam base vectors in each of Q spatial domain beam base vector groups; the Q spatial domain beam base vector groups are obtained by grouping spatial domain beam base vectors based on a descending order or ascending order of sum of amplitude value(s), a maximum amplitude value, or a sum of power of one or more combination coefficients corresponding to each of the spatial domain beam base vectors in the K combination coefficients; and is a positive integer less than or equal to L.

10. The method according to claim 6, wherein
in the precoding matrix indication information, the amplitude values of all of the K combination coefficients are located before the phase values of all the combination coefficients;
in the precoding matrix indication information, the amplitude values of all of the K combination coefficients are sequentially arranged based on a descending order or ascending order of indexes of the spatial domain beam base vectors corresponding to the combination coefficients or indexes of the frequency-domain base vectors corresponding to the combination coefficients; and
in the precoding matrix indication information, the phase values of all of the K combination coefficients are sequentially arranged based on a descending order or ascending order of indexes of the spatial domain beam base vectors corresponding to the combination coefficients or indexes of the frequency-domain base vectors corresponding to the combination coefficients; or in the precoding matrix indication information, for the Q combination coefficient groups to which the K combination coefficients respectively belong, phase values of the combination coefficient groups are sequentially arranged based on a descending order or ascending order of indexes of the combination coefficient groups; and in a phase indication of each combination coefficient group, phase indications of combination coefficients are sequentially arranged based on a descending order or ascending order of indexes of spatial domain beam base vectors corresponding to the combination coefficients or indexes of frequency-domain base vectors corresponding to the combination coefficients.

11. A precoding matrix indication apparatus, comprising at least one processor and a transceiver, wherein:
the at least one processor is configured to determine L and M, wherein L is a total quantity of spatial domain beam base vectors; and M is a total quantity of frequency-domain base vectors;
determine an amplitude value of each of K combination coefficients corresponding to each spatial layer, wherein the amplitude value of each combination coefficient is determined by using a same amplitude quantization bit quantity and a same amplitude quantization rule; K is a positive integer less than or equal to L*M; wherein the same amplitude quantization rule comprises logic defining whether a same amplitude is considered a larger amplitude value or a smaller amplitude value for purposes of grouping combination coefficients having the same amplitude;
group the K combination coefficients based on the amplitude value of each of the K combination coefficients, to obtain Q combination coefficient groups, wherein Q is an integer greater than or equal to 2, wherein grouping comprises identifying at least two combination coefficients in the K combination coefficients having the same amplitude, and sorting a first one of the at least two combination coefficients into a first coefficient group associated with larger amplitude values and sorting a second one of the at least two combination coefficients into a second coefficient group associated with smaller amplitude values based on the same amplitude quantization rule; and
determine a phase value of each combination coefficient in each combination coefficient group, wherein at least one of phase quantization bit quantities or phase quantization rules used by at least two of the Q combination coefficient groups are different; and
the transceiver is configured to send precoding matrix indication information, wherein the precoding matrix indication information comprises the amplitude value and the phase value of each of the K combination coefficients.

12. The apparatus according to claim 11, wherein the at least one processor is configured to:
group the K combination coefficients based on a descending order or ascending order of the amplitude values of all of the K combination coefficients, to obtain the Q combination coefficient groups.

13. The apparatus according to claim 12, wherein
in the Q combination coefficient groups, a minimum amplitude value, a maximum amplitude value, or sum of amplitude value(s) of combination coefficients in a q1th combination coefficient group is greater than a minimum amplitude value, a maximum amplitude value, or sum of amplitude value(s) of combination coefficients in a q2th combination coefficient group; a phase quantization bit quantity Bq1 used by the combination coefficients in the q1th combination coefficient group is greater than a phase quantization bit quantity Bq2 used by the combination coefficients in the q2th combination coefficient group; q1 is not equal to q2; and q1 and q2 are integers greater than or equal to 1 and less than or equal to Q.

14. The apparatus according to claim 11, wherein the at least one processor is configured to:
determine, in the K combination coefficients, one or more combination coefficients corresponding to each of spatial domain beam base vectors, wherein is a positive integer less than or equal to L;
group the spatial domain beam base vectors based on a descending order or ascending order of sum of amplitude value(s), a maximum amplitude value, or a sum of power of the one or more combination coefficients corresponding to each spatial domain beam base vector, to obtain Q spatial domain beam base vector groups; and
for one or more spatial domain beam base vectors in each of the Q spatial domain beam base vector groups, determine all combination coefficients corresponding to the one or more spatial domain beam base vectors as one combination coefficient group, to obtain the Q combination coefficient groups corresponding to the Q spatial domain beam base vector groups.

15. The apparatus according to claim 11, wherein
in the precoding matrix indication information, the amplitude values of all of the K combination coefficients are located before the phase values of all the combination coefficients;
in the precoding matrix indication information, the amplitude values of all of the K combination coefficients are sequentially arranged based on a descending order or ascending order of indexes of the spatial domain beam base vectors corresponding to the combination coefficients or indexes of the frequency-domain base vectors corresponding to the combination coefficients; and
in the precoding matrix indication information, the phase values of all of the K combination coefficients are sequentially arranged based on a descending order or ascending order of indexes of the spatial domain beam base vectors corresponding to the combination coefficients or indexes of the frequency-domain base vectors corresponding to the combination coefficients; or in the precoding matrix indication information, for the Q combination coefficient groups to which the K combination coefficients respectively belong, phase values of the combination coefficient groups are sequentially arranged based on a descending order or ascending order of indexes of the combination coefficient groups; and in a phase indication of each combination coefficient group, phase indications of combination coefficients are sequentially arranged based on a descending order or ascending order of indexes of spatial domain beam base vectors corresponding to the combination coefficients or indexes of frequency-domain base vectors corresponding to the combination coefficients.

16. A precoding matrix indication apparatus comprising at least one processor and a transceiver, wherein:
the transceiver is configured to receive precoding matrix indication information, wherein the precoding matrix indication information comprises an amplitude value and a phase value of each of K combination coefficients; and
the at least one processor is configured to determine the amplitude value and the phase value of each of the K combination coefficients based on the precoding matrix indication information, wherein
the amplitude value of each combination coefficient is determined by using a same amplitude quantization bit quantity and a same amplitude quantization rule; K is a positive integer less than or equal to L*M; L is a total quantity of spatial domain beam base vectors that is determined by a transmit end; and M is a total quantity of frequency-domain base vectors that is determined by the transmit end; wherein the same amplitude quantization rule comprises logic defining whether a same amplitude is considered a larger amplitude value or a smaller amplitude value for purposes of grouping combination coefficients having the same amplitude; and
Q combination coefficient groups to which the K combination coefficients respectively belong are obtained through grouping based on the amplitude values of the K combination coefficients, wherein grouping comprises identifying at least two combination coefficients in the K combination coefficients having the same amplitude, and sorting a first one of the at least two combination coefficients into a first coefficient group associated with larger amplitude values and sorting a second one of the at least two combination coefficients into a second coefficient group associated with smaller amplitude values based on the same amplitude quantization rule; the phase value of each combination coefficient is determined based on a phase quantization bit quantity and a phase quantization rule that are used by a combination coefficient group to which each combination coefficient belongs; and at least one of phase quantization bit quantities or phase quantization rules used by at least two of the Q combination coefficient groups are different.

17. The apparatus according to claim 16, wherein the Q combination coefficient groups to which the K combination coefficients respectively belong are obtained by grouping the K combination coefficients based on a descending order or ascending order of the amplitude values of all of the K combination coefficients.

18. The apparatus according to claim 17, wherein
in the Q combination coefficient groups, a minimum amplitude value, a maximum amplitude value, or sum of amplitude value(s) of combination coefficients in a q1th combination coefficient group is greater than a minimum amplitude value, a maximum amplitude value, or sum of amplitude value(s) of combination coefficients in a q2th combination coefficient group; a phase quantization bit quantity Bq1 used by the combination coefficients in the q1th combination coefficient group is greater than a phase quantization bit quantity Bq2 used by the combination coefficients in the q2th combination coefficient group; q1 is not equal to q2; and q1 and q2 are integers greater than or equal to 1 and less than or equal to Q.

19. The apparatus according to claim 16, wherein each of the Q combination coefficient groups to which the K combination coefficients respectively belong comprises all combination coefficients corresponding to spatial domain beam base vectors in each of Q spatial domain beam base vector groups; the Q spatial domain beam base vector groups are obtained by grouping spatial domain beam base vectors based on a descending order or ascending order of sum of amplitude value(s), a maximum amplitude value, or a sum of power of one or more combination coefficients corresponding to each of the spatial domain beam base vectors in the K combination coefficients; and is a positive integer less than or equal to L.

20. The apparatus according to claim 16, wherein
in the precoding matrix indication information, the amplitude values of all of the K combination coefficients are located before the phase values of all the combination coefficients;
in the precoding matrix indication information, the amplitude values of all of the K combination coefficients are sequentially arranged based on a descending order or ascending order of indexes of the spatial domain beam base vectors corresponding to the combination coefficients or indexes of the frequency-domain base vectors corresponding to the combination coefficients; and in the precoding matrix indication information, the phase values of all of the K combination coefficients are sequentially arranged based on a descending order or ascending order of indexes of the spatial domain beam base vectors corresponding to the combination coefficients or indexes of the frequency-domain base vectors corresponding to the combination coefficients; or in the precoding matrix indication information, for the Q combination coefficient groups to which the K combination coefficients respectively belong, phase values of the combination coefficient groups are sequentially arranged based on a descending order or ascending order of indexes of the combination coefficient groups; and in a phase indication of each combination coefficient group, phase indications of combination coefficients are sequentially arranged based on a descending order or ascending order of indexes of spatial domain beam base vectors corresponding to the combination coefficients or indexes of frequency-domain base vectors corresponding to the combination coefficients.

* * * * *